United States Patent
Khoshnevisan et al.

(10) Patent No.: US 12,213,132 B2
(45) Date of Patent: Jan. 28, 2025

(54) TRANSMISSION CONFIGURATION INDICATOR (TCI) STATE- BASED CONTROL CHANNEL ELEMENT (CCE)-TO-RESOURCE ELEMENT GROUP (REG) BUNDLE MAPPING

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 17/482,238

(22) Filed: Sep. 22, 2021

(65) Prior Publication Data

US 2022/0095342 A1 Mar. 24, 2022

Related U.S. Application Data

(60) Provisional application No. 63/083,080, filed on Sep. 24, 2020.

(51) Int. Cl.
*H04W 72/12* (2023.01)
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .............. H04W 72/1273; H04W 72/23; H04L 1/0045; H04L 1/0071; H04L 1/0072; H04L 5/0094; H04L 5/0053
See application file for complete search history.

(56) References Cited

U.S. PATENT DOCUMENTS

| | | | | |
|---|---|---|---|---|
| 2019/0140776 A1* | 5/2019 | Seo | ........................ | H04B 7/0456 |
| 2020/0153581 A1* | 5/2020 | Tsai | ........................ | H04W 24/10 |
| 2020/0178234 A1* | 6/2020 | Zhang | .................... | H04L 5/0053 |
| 2020/0329477 A1* | 10/2020 | Zhang | ............... | H04W 72/0446 |
| 2021/0050936 A1* | 2/2021 | Seo | ........................ | H04W 72/20 |

(Continued)

*Primary Examiner* — Hoang-Chuong Q Vu
(74) *Attorney, Agent, or Firm* — Holland & Hart LLP /Qualcomm Incorporated

(57) ABSTRACT

Methods, systems, and devices for wireless communications are described. A user equipment (UE) may perform a blind decoding process on a downlink control channel (e.g., a physical downlink control channel (PDCCH)) in a control resource set (CORESET). The UE may receive a configuration indicating that the CORESET is configured with multiple sets of resource element group (REG) bundles, and each set of REG bundles may be associated with a transmission configuration indicator (TCI) state. The UE may map control channel elements (CCEs) of the CORESET to one or more REG bundles of the sets of REG bundles. A PDCCH candidate may be associated with the CORESET, and the UE may determine CCEs for the PDCCH candidate based on the mapping such that the PDCCH candidate includes at least one REG bundle associated with each TCI state. The UE may monitor the PDCCH candidate for downlink control information (DCI).

28 Claims, 21 Drawing Sheets

(56) References Cited

U.S. PATENT DOCUMENTS

| | | | |
|---|---|---|---|
| 2022/0007371 A1* | 1/2022 | Kyung | H04W 72/0453 |
| 2022/0078834 A1* | 3/2022 | Wu | H04L 27/0006 |
| 2022/0377744 A1* | 11/2022 | Zhang | H04L 5/0053 |
| 2023/0108044 A1* | 4/2023 | Zhang | H04L 5/0091 370/329 |
| 2023/0156665 A1* | 5/2023 | Gao | H04W 72/02 370/329 |
| 2023/0198721 A1* | 6/2023 | Gao | H04L 5/0082 370/329 |

* cited by examiner

CCE0      CCE1

CCE0    CCE1

TRANSMISSION CONFIGURATION INDICATOR (TCI) STATE- BASED CONTROL CHANNEL ELEMENT (CCE)-TO-RESOURCE ELEMENT GROUP (REG) BUNDLE MAPPING

CROSS REFERENCE

The present application for patent claims the benefit of U.S. Provisional Patent Application No. 63/083,080 by KHOSHNEVISAN et al., entitled "TRANSMISSION CONFIGURATION INDICATOR (TCI) STATE-BASED CONTROL CHANNEL ELEMENT (CCE)-TO-RESOURCE ELEMENT GROUP (REG) BUNDLE MAPPING," filed Sep. 24, 2020, assigned to the assignee hereof, and expressly incorporated by reference herein.

FIELD OF TECHNOLOGY

The following relates to wireless communications, including transmission configuration indicator (TCI) state-based control channel element (CCE)-to-resource element group (REG) bundle mapping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a device may attempt to decode (e.g., blind decode) a control channel (e.g., a physical downlink control channel (PDCCH)). The device may attempt to decode the control channel in PDCCH candidates of a control resource set (CORESET) to receive downlink control information (DCI). A CORESET may include control channel elements (CCEs) that, in turn, may include resource element group (REG) bundles. In some cases, a CORESET may be associated with multiple transmission configuration indicator (TCI) states. However, if a PDCCH candidate of the CORESET is not mapped to the multiple TCI states, the PDCCH candidate may fail to support flexible configuration of DCI messages or TCI state diversity.

SUMMARY

The described techniques relate to improved methods, systems, devices, and apparatuses that support transmission configuration indicator (TCI) state-based control channel element (CCE)-to-resource element group (REG) bundle mapping. Generally, the described techniques provide for enhanced diversity and reliability of control channel signaling. A user equipment (UE) may perform a blind decoding process on a downlink control channel (e.g., a physical downlink control channel (PDCCH)) in a control resource set (CORESET). In some examples, the UE may receive a message from a base station indicating that the CORESET is configured with multiple TCI states in a frequency division multiplexed (FDMed) manner, such that a first set of REG bundles is associated with a first TCI state and a second set of REG bundles is associated with a second TCI state. The UE may map CCEs of the CORESET to one or more REG bundles of the sets of REG bundles. In some examples, the UE may map subsequent CCEs to different set of the REG bundles (and, correspondingly, different TCI states). In some other examples, the UE may map each CCE to both sets of REG bundles (and, correspondingly, both TCI states). A PDCCH candidate may be associated with the CORESET, and the UE may determine CCEs for the PDCCH candidate based on the mapping, such that each PDCCH candidate includes CCEs corresponding to both TCI states of the CORESET. The UE may use the determined CCEs to monitor for a DCI message in the PDCCH candidate. Additionally or alternatively, the UE may determine that a precoding granularity of the CORESET is applied across resource blocks (RBs) associated with the same TCI state if the precoding granularity is set to "all contiguous RBs," as opposed to across all contiguous RBs of the CORESET (e.g., regardless of TCI state).

A method for wireless communications at a UE is described. The method may include receiving an indication of a CORESET configured with a first set of REG bundles associated with a first TCI state and a second set of REG bundles associated with a second TCI state, mapping each CCE of the CORESET to one or more first REG bundles of the first set of REG bundles, one or more second REG bundles of the second set of REG bundles, or both, determining a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and monitoring for a DCI message in the PDCCH candidate associated with the CORESET based on the set of CCEs.

An apparatus for wireless communications is described. The apparatus may include a processor of a UE and memory coupled with the processor. The memory and the processor may be configured to receive an indication of a CORESET configured with a first set of REG bundles associated with a first TCI state and a second set of REG bundles associated with a second TCI state, map each CCE of the CORESET to one or more first REG bundles of the first set of REG bundles, one or more second REG bundles of the second set of REG bundles, or both, determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and monitor for a DCI message in the PDCCH candidate associated with the CORESET based on the set of CCEs.

Another apparatus for wireless communications at a UE is described. The apparatus may include means for receiving an indication of a CORESET configured with a first set of REG bundles associated with a first TCI state and a second set of REG bundles associated with a second TCI state, mapping each CCE of the CORESET to one or more first REG bundles of the first set of REG bundles, one or more second REG bundles of the second set of REG bundles, or both, determining a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and monitoring for a DCI message in the PDCCH candidate associated with the CORESET based on the set of CCEs.

A non-transitory computer-readable medium storing code for wireless communications at a UE is described. The code may include instructions executable by a processor to receive an indication of a CORESET configured with a first set of REG bundles associated with a first TCI state and a second set of REG bundles associated with a second TCI state, map each CCE of the CORESET to one or more first REG bundles of the first set of REG bundles, one or more second REG bundles of the second set of REG bundles, or both, determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and monitor for a DCI message in the PDCCH candidate associated with the CORESET based on the set of CCEs.

Some examples of the method, apparatuses, and non-transitory computer-readable medium described herein may further include operations, features, means, or instructions for interleaving the first set of REG bundles associated with the first TCI state according to an interleaver function and separately interleaving the second set of REG bundles associated with the second TCI state according to the interleaver function, where the mapping may be performed based on the interleaved first set of REG bundles and the separately interleaved second set of REG bundles.

Some examples of the method, apparatuses, and non-transitory computer-readable medium described herein may further include operations, features, means, or instructions for refraining from interleaving the first set of REG bundles associated with the first TCI state based on applying an identity function to the first set of REG bundles and refraining from interleaving the second set of REG bundles associated with the second TCI state based on applying the identity function to the second set of REG bundles, where the mapping may be performed based on refraining from interleaving the first set of REG bundles and refraining from interleaving the second set of REG bundles.

Some examples of the method, apparatuses, and non-transitory computer-readable medium described herein may further include operations, features, means, or instructions for generating a first set of indices for the first set of REG bundles associated with the first TCI state and separately generating a second set of indices for the second set of REG bundles associated with the second TCI state.

In some examples of the method, apparatuses, and non-transitory computer-readable medium described herein, the mapping may include operations, features, means, or instructions for mapping a first CCE of the CORESET to the one or more first REG bundles of the first set of REG bundles based on a first index of the first CCE and mapping a second CCE of the CORESET to the one or more second REG bundles of the second set of REG bundles based on a second index of the second CCE, where the set of CCEs for the PDCCH candidate includes at least the first CCE and the second CCE.

In some examples of the method, apparatuses, and non-transitory computer-readable medium described herein, the first CCE may be mapped to the one or more first REG bundles of the first set of REG bundles based on the first index being even, and the second CCE may be mapped to the one or more second REG bundles of the second set of REG bundles based on the second index being odd.

In some examples of the method, apparatuses, and non-transitory computer-readable medium described herein, the mapping may include operations, features, means, or instructions for mapping a first CCE of the CORESET to the one or more first REG bundles of the first set of REG bundles and the one or more second REG bundles of the second set of REG bundles, where the set of CCEs for the PDCCH candidate includes at least the first CCE.

In some examples of the method, apparatuses, and non-transitory computer-readable medium described herein, mapping the first CCE may include operations, features, means, or instructions for alternating mapping the first CCE to a respective REG bundle of the first set of REG bundles and to a respective REG bundle of the second set of REG bundles.

Some examples of the method, apparatuses, and non-transitory computer-readable medium described herein may further include operations, features, means, or instructions for receiving a radio resource control (RRC) message indicating a CCE mapping rule, where the mapping may be based on the CCE mapping rule.

Some examples of the method, apparatuses, and non-transitory computer-readable medium described herein may further include operations, features, means, or instructions for storing, in memory, a CCE mapping rule, where the mapping may be based on the CCE mapping rule.

Some examples of the method, apparatuses, and non-transitory computer-readable medium described herein may further include operations, features, means, or instructions for receiving an RRC message configuring the first set of REG bundles with the first TCI state and the second set of REG bundles with the second TCI state.

Some examples of the method, apparatuses, and non-transitory computer-readable medium described herein may further include operations, features, means, or instructions for storing, in memory, a TCI state mapping rule configuring the first set of REG bundles with the first TCI state and the second set of REG bundles with the second TCI state.

Some examples of the method, apparatuses, and non-transitory computer-readable medium described herein may further include operations, features, means, or instructions for receiving, based on the monitoring, the DCI message in the PDCCH candidate according to the first TCI state and the second TCI state based on the set of CCEs for the PDCCH candidate including at least the first REG bundle associated with the first TCI state and at least the second REG bundle associated with the second TCI state.

In some examples of the method, apparatuses, and non-transitory computer-readable medium described herein, the PDCCH candidate corresponds to an aggregation level, and the set of CCEs for the PDCCH candidate includes a number of CCEs equal to the aggregation level.

In some examples of the method, apparatuses, and non-transitory computer-readable medium described herein, each REG bundle of the first set of REG bundles and the second set of REG bundles includes a number of REGs based on a REG bundle size.

Some examples of the method, apparatuses, and non-transitory computer-readable medium described herein may further include operations, features, means, or instructions for receiving an RRC message indicating the REG bundle size, where the REG bundle size may be based on a number of symbols of the CORESET.

In some examples of the method, apparatuses, and non-transitory computer-readable medium described herein, the number of REGs in each REG bundle includes one REG, two REGs, three REGs, or six REGs.

A method for wireless communications at a base station is described. The method may include configuring a CORESET with a first set of REG bundles associated with a first TCI state and a second set of REG bundles associated with a second TCI state, mapping each CCE of the CORESET to one or more first REG bundles of the first set of REG bundles, one or more second REG bundles of the second set of REG bundles, or both, determining a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and transmitting a DCI message in the PDCCH candidate associated with the CORESET based on the set of CCEs.

An apparatus for wireless communications is described. The apparatus may include a processor of a base station and memory coupled with the processor. The memory and the processor may be configured to configure a CORESET with a first set of REG bundles associated with a first TCI state and a second set of REG bundles associated with a second TCI state, map each CCE of the CORESET to one or more first REG bundles of the first set of REG bundles, one or more second REG bundles of the second set of REG bundles, or both, determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and transmit a DCI message in the PDCCH candidate associated with the CORESET based on the set of CCEs.

Another apparatus for wireless communications at a base station is described. The apparatus may include means for configuring a CORESET with a first set of REG bundles associated with a first TCI state and a second set of REG bundles associated with a second TCI state, mapping each CCE of the CORESET to one or more first REG bundles of the first set of REG bundles, one or more second REG bundles of the second set of REG bundles, or both, determining a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and transmitting a DCI message in the PDCCH candidate associated with the CORESET based on the set of CCEs.

A non-transitory computer-readable medium storing code for wireless communications at a base station is described. The code may include instructions executable by a processor to configure a CORESET with a first set of REG bundles associated with a first TCI state and a second set of REG bundles associated with a second TCI state, map each CCE of the CORESET to one or more first REG bundles of the first set of REG bundles, one or more second REG bundles of the second set of REG bundles, or both, determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and transmit a DCI message in the PDCCH candidate associated with the CORESET based on the set of CCEs.

Some examples of the method, apparatuses, and non-transitory computer-readable medium described herein may further include operations, features, means, or instructions for interleaving the first set of REG bundles associated with the first TCI state according to an interleaver function and separately interleaving the second set of REG bundles associated with the second TCI state according to the interleaver function, where the mapping may be performed based on the interleaved first set of REG bundles and the separately interleaved second set of REG bundles.

Some examples of the method, apparatuses, and non-transitory computer-readable medium described herein may further include operations, features, means, or instructions for refraining from interleaving the first set of REG bundles associated with the first TCI state based on applying an identity function to the first set of REG bundles and refraining from interleaving the second set of REG bundles associated with the second TCI state based on applying the identity function to the second set of REG bundles, where the mapping may be performed based on refraining from interleaving the first set of REG bundles and refraining from interleaving the second set of REG bundles.

Some examples of the method, apparatuses, and non-transitory computer-readable medium described herein may further include operations, features, means, or instructions for generating a first set of indices for the first set of REG bundles associated with the first TCI state and separately generating a second set of indices for the second set of REG bundles associated with the second TCI state.

In some examples of the method, apparatuses, and non-transitory computer-readable medium described herein, the mapping may include operations, features, means, or instructions for mapping a first CCE of the CORESET to the one or more first REG bundles of the first set of REG bundles based on a first index of the first CCE and mapping a second CCE of the CORESET to the one or more second REG bundles of the second set of REG bundles based on a second index of the second CCE, where the set of CCEs for the PDCCH candidate includes at least the first CCE and the second CCE.

In some examples of the method, apparatuses, and non-transitory computer-readable medium described herein, the mapping may include operations, features, means, or instructions for mapping a first CCE of the CORESET to the one or more first REG bundles of the first set of REG bundles and the one or more second REG bundles of the second set of REG bundles, where the set of CCEs for the PDCCH candidate includes at least the first CCE.

Some examples of the method, apparatuses, and non-transitory computer-readable medium described herein may further include operations, features, means, or instructions for transmitting an RRC message indicating a CCE mapping rule, where the mapping may be based on the CCE mapping rule.

Some examples of the method, apparatuses, and non-transitory computer-readable medium described herein may further include operations, features, means, or instructions for transmitting an RRC message configuring the first set of REG bundles with the first TCI state and the second set of REG bundles with the second TCI state.

In some examples of the method, apparatuses, and non-transitory computer-readable medium described herein, the DCI message may be transmitted according to the first TCI state and the second TCI state based on the set of CCEs for the PDCCH candidate including at least the first REG bundle associated with the first TCI state and at least the second REG bundle associated with the second TCI state.

A method for wireless communications at a UE is described. The method may include receiving an indication of a CORESET configured with a first set of REG bundles associated with a first TCI state, a second set of REG bundles associated with a second TCI state, and a precoding granularity set to all contiguous resource blocks, determining that a first precoder is applied across the first set of REG bundles associated with the first TCI state based on the precoding granularity being set to all contiguous resource blocks, determining that a second precoder is applied across the second set of REG bundles associated with the second TCI state based on the precoding granularity being set to all contiguous resource blocks, and monitoring for a DCI message in a PDCCH candidate associated with the CORESET based on the determination that the first precoder is applied across the first set of REG bundles, the determination that the second precoder is applied across the second set of REG bundles, or both.

An apparatus for wireless communications is described. The apparatus may include a processor of a UE and memory coupled with the processor. The memory and the processor may be configured to receive an indication of a CORESET configured with a first set of REG bundles associated with a first TCI state, a second set of REG bundles associated with a second TCI state, and a precoding granularity set to all contiguous resource blocks, determine that a first precoder is applied across the first set of REG bundles associated with the first TCI state based on the precoding granularity being set to all contiguous resource blocks, determine that a second precoder is applied across the second set of REG bundles associated with the second TCI state based on the precoding granularity being set to all contiguous resource blocks, and monitor for a DCI message in a PDCCH candidate associated with the CORESET based on the determination that the first precoder is applied across the first set of REG bundles, the determination that the second precoder is applied across the second set of REG bundles, or both.

Another apparatus for wireless communications at a UE is described. The apparatus may include means for receiving an indication of a CORESET configured with a first set of REG bundles associated with a first TCI state, a second set of REG bundles associated with a second TCI state, and a precoding granularity set to all contiguous resource blocks, determining that a first precoder is applied across the first set of REG bundles associated with the first TCI state based on the precoding granularity being set to all contiguous resource blocks, determining that a second precoder is applied across the second set of REG bundles associated with the second TCI state based on the precoding granularity being set to all contiguous resource blocks, and monitoring for a DCI message in a PDCCH candidate associated with the CORESET based on the determination that the first precoder is applied across the first set of REG bundles, the determination that the second precoder is applied across the second set of REG bundles, or both.

A non-transitory computer-readable medium storing code for wireless communications at a UE is described. The code may include instructions executable by a processor to receive an indication of a CORESET configured with a first set of REG bundles associated with a first TCI state, a second set of REG bundles associated with a second TCI state, and a precoding granularity set to all contiguous resource blocks, determine that a first precoder is applied across the first set of REG bundles associated with the first TCI state based on the precoding granularity being set to all contiguous resource blocks, determine that a second precoder is applied across the second set of REG bundles associated with the second TCI state based on the precoding granularity being set to all contiguous resource blocks, and monitor for a DCI message in a PDCCH candidate associated with the CORESET based on the determination that the first precoder is applied across the first set of REG bundles, the determination that the second precoder is applied across the second set of REG bundles, or both.

In some examples of the method, apparatuses, and non-transitory computer-readable medium described herein, the first set of REG bundles may be configured to include up to four subsets of resource blocks of the CORESET that may be non-contiguous in a frequency domain, and the second set of REG bundles may be configured to include up to four additional subsets of resource blocks of the CORESET that may be non-contiguous in the frequency domain.

In some examples of the method, apparatuses, and non-transitory computer-readable medium described herein, receiving the indication of the CORESET may include operations, features, means, or instructions for receiving an RRC message including the indication of the CORESET.

Some examples of the method, apparatuses, and non-transitory computer-readable medium described herein may further include operations, features, means, or instructions for performing a first joint channel estimation across the first set of REG bundles associated with the first TCI state based on the determination that the first precoder may be applied across the first set of REG bundles and performing a second joint channel estimation across the second set of REG bundles associated with the second TCI state based on the determination that the second precoder may be applied across the second set of REG bundles.

A method for wireless communications at a base station is described. The method may include configuring a CORESET with a first set of REG bundles associated with a first TCI state, a second set of REG bundles associated with a second TCI state, and a precoding granularity set to all contiguous resource blocks, determining to use a first precoder across the first set of REG bundles associated with the first TCI state based on the precoding granularity being set to all contiguous resource blocks, determining to use a second precoder different from the first precoder across the second set of REG bundles associated with the second TCI state based on the precoding granularity being set to all contiguous resource blocks, and transmitting a DCI message in a PDCCH candidate associated with the CORESET based on the first precoder, the second precoder, or both.

An apparatus for wireless communications is described. The apparatus may include a processor of a base station and memory coupled with the processor. The memory and the processor may be configured to configure a CORESET with a first set of REG bundles associated with a first TCI state, a second set of REG bundles associated with a second TCI state, and a precoding granularity set to all contiguous resource blocks, determine to use a first precoder across the first set of REG bundles associated with the first TCI state based on the precoding granularity being set to all contiguous resource blocks, determine to use a second precoder different from the first precoder across the second set of REG bundles associated with the second TCI state based on the precoding granularity being set to all contiguous resource blocks, and transmit a DCI message in a PDCCH candidate associated with the CORESET based on the first precoder, the second precoder, or both.

Another apparatus for wireless communications at a base station is described. The apparatus may include means for configuring a CORESET with a first set of REG bundles associated with a first TCI state, a second set of REG bundles associated with a second TCI state, and a precoding granularity set to all contiguous resource blocks, determining to use a first precoder across the first set of REG bundles associated with the first TCI state based on the precoding granularity being set to all contiguous resource blocks, determining to use a second precoder different from the first precoder across the second set of REG bundles associated with the second TCI state based on the precoding granularity being set to all contiguous resource blocks, and transmitting a DCI message in a PDCCH candidate associated with the CORESET based on the first precoder, the second precoder, or both.

A non-transitory computer-readable medium storing code for wireless communications at a base station is described. The code may include instructions executable by a processor to configure a CORESET with a first set of REG bundles associated with a first TCI state, a second set of REG bundles associated with a second TCI state, and a precoding granularity set to all contiguous resource blocks, determine to use a first precoder across the first set of REG bundles associated with the first TCI state based on the precoding granularity being set to all contiguous resource blocks, determine to use a second precoder different from the first precoder across the second set of REG bundles associated with the second TCI state based on the precoding granularity being set to all contiguous resource blocks, and transmit a DCI message in a PDCCH candidate associated with the CORESET based on the first precoder, the second precoder, or both.

In some examples of the method, apparatuses, and non-transitory computer-readable medium described herein, configuring the CORESET further may include operations, features, means, or instructions for configuring the first set of REG bundles to include up to four subsets of resource blocks that may be non-contiguous in a frequency domain and configuring the second set of REG bundles to include up to four additional subsets of resource blocks that may be non-contiguous in the frequency domain.

Some examples of the method, apparatuses, and non-transitory computer-readable medium described herein may further include operations, features, means, or instructions for transmitting an RRC message including an indication of the configured CORESET.

DETAILED DESCRIPTION

Figure 1:
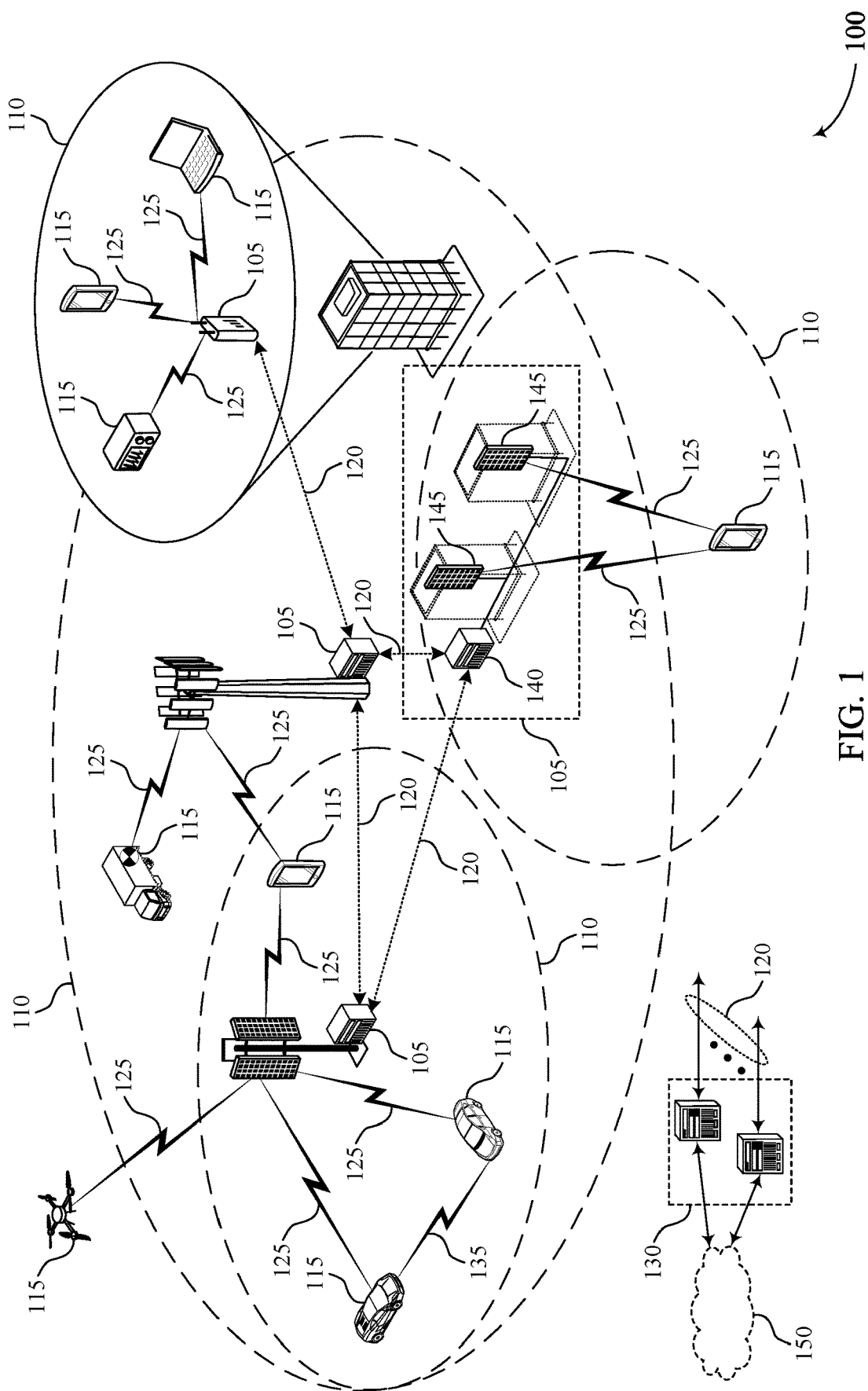
FIGS. 1 through 3 illustrate examples of wireless communications systems that support transmission configuration indicator (TCI) state-based control channel element (CCE)-to-resource element group (REG) bundle mapping in accordance with aspects of the present disclosure.

In some wireless communications systems, a user equipment (UE) may attempt to decode (e.g., blind decode) a control channel (e.g., a physical downlink control channel (PDCCH)). The UE may perform a blind decoding process on signals received over the control channel in a control resource set (CORESET) to identify downlink control information (DCI) received from a base station. In some cases, a CORESET may include control channel elements (CCEs) that include one or more resource element group (REG) bundles. The CORESET may be associated with one or more TCI states, which may provide quasi-co location (QCL) information associated with one or more reference signals. For example, the CORESET may be associated with multiple TCI states in a frequency division multiplexed (FDMed) manner, such that a first set of REG bundles may correspond to a first TCI state and a second set of REG bundles may correspond to a second TCI state. Increasing the number of TCI states (e.g., for a control channel) may increase the TCI state diversity and, in turn, may potentially improve the reliability of a channel. However, if a PDCCH candidate is mapped to one set of REG bundles but not the other (and thus one TCI state but not the other), the benefits of the CORESET supporting multiple TCI states may be lost to the PDCCH candidate. For instance, if the PDCCH candidate maps to a single TCI state and a transmission/reception point (TRP) associated with that TCI state is blocked, the UE may not be able to receive or decode a DCI message in the PDCCH candidate. TCI state diversity and flexibility may thus improve signaling reliability of DCI messages in a PDCCH candidate if the PDCCH candidate is associated with multiple TCI states.

Accordingly, the techniques described herein relate to enhancing TCI state diversity and reliability of control channels (e.g., PDCCH candidates). A CORESET may be configured with multiple sets of REG bundles, and a UE may map CCEs of the CORESET to one or more REG bundles according to TCI state information of the one or more REG bundles. For example, a first set of REG bundles may be associated with a first TCI state of the CORESET and a second set of REG bundles may be associated with a second TCI state of the CORESET. The UE may map CCEs to REG bundles such that a PDCCH candidate associated with the CCEs maps to both TCI states. In some cases, the UE may separately interleave each set of REG bundles (e.g., such that each set of REG bundles is interleaved independently of any other sets of REG bundles). Additionally or alternatively, the UE may separately generate indices (e.g., based on a formula) for REG bundles of each set of REG bundles. The UE may determine the mapping between CCEs and REG bundles according to the interleaving, the REG bundle indices, or some combination thereof. In some examples, the UE may determine the mapping according to a rule (e.g., a defined rule, a configured rule, etc.).

As an example, each CCE may be mapped to interleaved REG bundles in one set of REG bundles (e.g., corresponding to one TCI state), such that a CCE corresponds to a single TCI state. However, each subsequent CCE may be mapped to a different set of REG bundles. Thus, alternating CCEs may map to different sets of REG bundles (e.g., associated with different TCI states), such that a PDCCH candidate with at least two CCEs may include a first CCE associated with a first TCI state and a second CCE associated with a second TCI state. In another example, each CCE may be mapped to multiple sets of REG bundles (e.g., corresponding to multiple TCI states) in an alternating manner, and a PDCCH candidate may thus include one CCE associated with multiple TCI states.

Additionally or alternatively, each CORESET may be configured with a precoding granularity, and the UE may assume the precoding granularity for the CORESET based on a higher layer parameter (e.g., precoderGranularity). For example, the UE may use the same precoding within a REG bundle (e.g., ifprecoderGranularity is equal to sameAsREGbundle), or may use the same precoding across all REGs within a set of contiguous resource blocks (RBs) in the CORESET (e.g., ifprecoderGranularity is equal to allContiguousRBs). If, as described herein, the CORESET is configured with REG bundles associated with different TCI states, the UE may assume the applicability of a precoding granularity based on the TCI states of the REG bundles. For example, ifprecoderGranularity is equal to allContiguousRBs, the UE may determine that the same precoding is applied across all REGs within the set of contiguous RBs in the CORESET that are associated with the same TCI state. However, a different precoding may be applied in other REGs of the CORESET associated with a different TCI state. In some cases, the CORESET may include a number of subsets of contiguous RBs associated with a specific TCI state, where the different subsets may be non-contiguous in frequency. A base station may configure the UE with a number of such subsets in a CORESET up to a threshold number, such as four (e.g., if precoderGranularity is equal to allContiguousRBs).

Aspects of the disclosure are initially described in the context of wireless communications systems. Additionally, aspects of the disclosure are described in the context of CCE-to-REG bundle mapping configurations and process flows. Aspects of the disclosure are further illustrated by and described with reference to apparatus diagrams, system diagrams, and flowcharts that relate to TCI state-based CCE-to-REG bundle mapping.

FIG. 1 illustrates an example of a wireless communications system 100 that supports TCI state-based CCE-to-REG bundle mapping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, CORESETs associated with a downlink control channel (e.g., PDCCH) may support multiple TCI states in an FDM manner. A UE 115, a base station 105, or both may map CCEs of the CORESET to REG bundles according to TCI state information of the REG bundles such that a PDCCH candidate associated with the CCEs may be mapped to the multiple TCI states. For example, a base station 105 may configure a CORESET with one or more sets of REG bundles, and each set may be associated with a TCI state. In some examples, the base station 105 may transmit signaling indicating the CORESET configuration to a UE 115. In some cases, the base station 105 may also transmit other indications (e.g., radio resource control (RRC) signaling, control signaling, configuration signaling), for example, a mapping rule, a REG bundle size, a REG bundle TCI state configuration, or any combination thereof. The UE 115 may map CCEs of the CORESET to REG bundles of the sets of REG bundles and may determine CCEs for a PDCCH candidate according to the mapping (e.g., such that the PDCCH candidate includes CCEs associated with multiple TCI states).

As described herein, such techniques may be used to improve the TCI state diversity and reliability of a downlink control channel. For example, configuring (e.g., defining or assigning) multiple TCI states for a CORESET associated with a downlink control channel may provide a UE 115 with additional information, such as additional knowledge of quasi-co located (QCL) reference signals. Determining CCEs for PDCCH candidates based on TCI states of the associated REG bundles may increase diversity of the control channel candidates, which may also increase communications reliability. Additionally or alternatively, the improved TCI state diversity may enable the UE 115 to improve channel estimation for the downlink control channel and enhance the ability of the UE 115 to accurately manage different reception beams used for receiving information over the downlink control channel. As such, the UE 115 may be more likely to successfully receive and decode the downlink control channel (e.g., than when supporting a single TCI state), which may result in increased reliability of the downlink control channel and improve overall efficiency of the wireless communications system 100.

Figure 2:
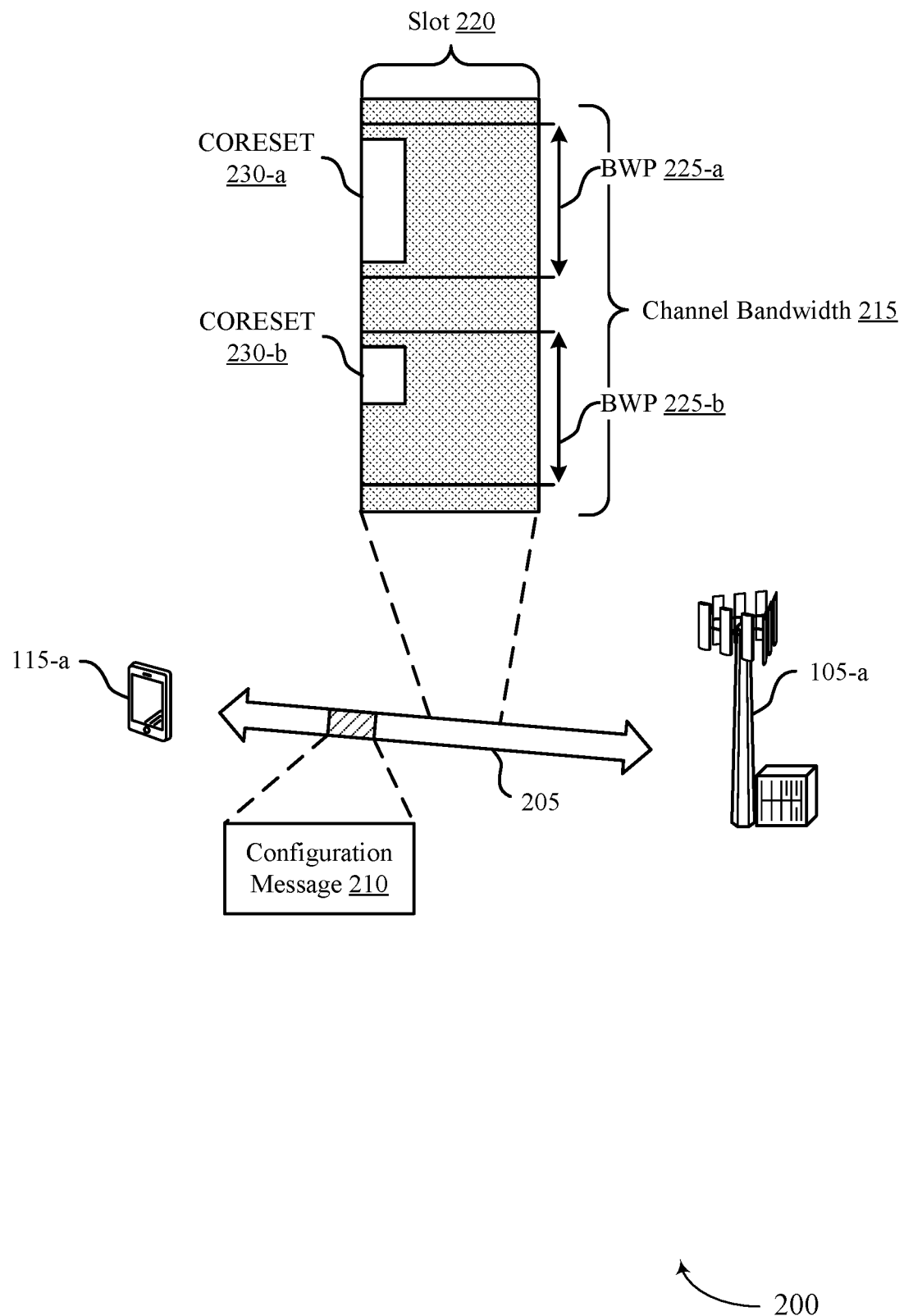

FIG. 2 illustrates an example of a wireless communications system 200 that supports TCI state-based CCE-to-REG bundle mapping in accordance with aspects of the present disclosure. In some examples, the wireless communications system 200 may implement aspects of a wireless communications system 100. The wireless communications system 200 may include a UE 115-*a* and a base station 105-*a*, which may be examples of the corresponding wireless devices described with reference to FIG. 1. The base station 105-*a* may transmit over a control channel (e.g., via a downlink control channel, such as a PDCCH) to the UE 115-*a* (e.g., over a communication link 205). In some examples, the wireless communications system 200 may be configured to support downlink control channel candidates associated with multiple TCI states.

Communication link 205 may include a PDCCH, a broadcast control channel (BCCH), a broadcast channel (BCH), or any other suitable communication channel for downlink control transmissions. In some examples, the base station 105-*a* may transmit a configuration message 210 to the UE 115-*a* via higher layer control signaling (e.g., in an RRC message). The configuration message 210 may indicate configuration information for one or more aspects of the control channel.

The UE 115-*a* and the base station 105-*a* may communicate in a channel bandwidth 215, which may include one or more bandwidth parts (BWPs), such as BWPs 225-*a* and 225-*b*. As an example, a base station 105-*a* may transmit DCI on a downlink control channel (e.g., a PDCCH), and the UE 115-*a* may receive the DCI on the downlink control channel at one or more resource locations (e.g., resources in time, frequency, or both) based on an operating BWP, such as a BWP 225, of the UE 115-*a*. In order to receive the DCI on the downlink control channel, the UE 115-*a* may monitor for one or more downlink control channel candidates (e.g., occasions where the UE 115-*a* may receive DCI messages) in a BWP 225 and during a slot 220. In some cases, the UE 115-*a* may monitor for downlink control channel candidates (e.g., PDCCH candidates) in a number (e.g., 3 or 5) of CORESETs, such as CORESETs 230, based on the operating BWP 225 of the UE 115-*a*. For example, the UE 115-*a* may monitor for PDCCH candidates in CORESET 230-*a* based on BWP 225-*a* and may monitor for PDCCH candidates in CORESET 230-*b* based on BWP 225-*b*.

A CORESET 230 may span a duration of a number of symbol periods in a slot 220 and may include a number of RBs (e.g., a frequency domain unit of the CORESET 230). An RB in one symbol (e.g., an OFDM symbol) may be referred to as an REG, and multiple REGs may be bundled together. The CORESETs 230 may also be associated with one or more properties, and the UE 115-*a* may monitor downlink control channel candidates in the CORESETs 230 based on identifying the one or more properties of the CORESETs 230. Additionally, a DCI message (e.g., a DCI message including scheduling information for a data channel) may be transmitted by a base station 105-*a* in a PDCCH candidate within a CORESET 230 (e.g., and the UE 115-*a* may receive the DCI message in the PDCCH candidate within the CORESET 230) and, in some cases, the DCI message may be transmitted according one or more TCI states.

In some examples, the UE 115-*a* may be configured with a number (e.g., 10) of search space sets associated with the operating BWPs 225 of the UE 115-*a* and may monitor for PDCCH candidates based on one or more search space sets. In some cases, each search space set may be associated with a CORESET 230 and a number of monitoring occasions for PDCCH candidates associated with the CORESET 230 (e.g., each search space set may correspond to the resource locations in time where the UE 115-*a* may attempt to receive a downlink control channel message within a CORESET 230). The UE 115-*a* may identify a search space set of the number of configured search space sets to use for monitoring downlink control channel (e.g., PDCCH) candidates within a CORESET 230. In some cases, the search space set may be configured with a number of downlink control channel candidates for an aggregation level. In some aspects, a number of CCEs may be associated with a downlink control channel candidate, and the number of CCEs associated with the downlink control channel candidate may be based on the aggregation level configured for the downlink control channel candidate.

The search space set may indicate the resource locations (e.g., in time, frequency, or a combination thereof) in which the UE 115-*a* may receive a DCI message based on a number of properties associated with the search space set. For example, the search space set may be associated with at least one of a slot periodicity and offset (e.g., defined by a monitoringSlotPeriodicityAndOffset field associated with the search space set), a number of symbols or slots within a period of the search space set (e.g., defined by a duration field associated with the search space set), a monitoring pattern within a slot (e.g., defined by a monitoringSymbolsWithinSlot field associated with the search space set), or any combination thereof. In some cases, the search space set may be associated with a search space set type (e.g., a UE-specific search space set or a common search space set, among other examples), which may correspond to a type of downlink control channel that the UE 115-*a* may monitor (e.g., a UE-specific downlink control channel or a common downlink control channel) and one or more DCI formats for which the UE 115-*a* may monitor.

As described herein, the UE 115-*a* may monitor for one or more downlink control channel (e.g., PDCCH) candidates in a search space set associated with a CORESET 230 based on a BWP 225 and the search space set. In some implementations, the base station 105-*a* may transmit the configuration message 210 to the UE 115-*a* over a communication link 205 indicating configuration information for the CORESET(s) 230, the search space sets, the PDCCH candidates, or any combination thereof. For example, the configuration message 210 may indicate that a CORESET 230 (e.g., CORESET 230-*a*) is configured with one or more sets of REG bundles, and each set of REG bundles may be associated with a TCI state. For example, the configuration message 210 may indicate that CORESET 230-*a* is configured with a first set of REG bundles corresponding to a first TCI state and a second set of REG bundles corresponding to a second TCI state. The UE 115-a may use the configuration information to determine a set of CCEs for a PDCCH candidate such that the PDCCH candidate is associated with one or more REG bundles from each configured TCI state. For example, configuring (e.g., defining or assigning) multiple TCI states for a CORESET 230 associated with a downlink control channel may provide the UE 115-a with additional information, such as additional knowledge of QCL reference signals. Additionally, determining CCEs for PDCCH candidates based on TCI states of the associated REG bundles may increase TCI state diversity of the PDCCH candidates (e.g., by ensuring that each PDCCH candidate in a CORESET associated with multiple TCI states is itself associated with multiple TCI states), which may also increase communications reliability.

In some examples, the configuration message 210 may include an indication of a precoder granularity for a CORESET 230. For example, the configuration message 210 may indicate that the precoder granularity for a CORESET 230 is configured for narrowband channel estimation (e.g., the precoder granularity is defined as sameAsREG-bundle). If the precoder granularity of the CORESET 230 is configured for narrowband channel estimation, the UE 115-a may assume that REGs included in a REG bundle of the CORESET 230 are associated with a same precoding. Similarly, the UE 115-a may assume that REGs included in different REG bundles of the CORESET 230 may be associated with different precodings.

Alternatively, the configuration message 210 may indicate that the precoder granularity for the CORESET 230 is configured for wideband channel estimation (e.g., the precoder granularity is defined as allContiguousRBs). In this case, the UE 115-a may assume that a contiguous set of RBs of the CORESET 230 is associated with a same precoding. However, if the CORESET 230 is configured with multiple TCI states, the UE 115-a may assume that the precoding granularity of allContiguousRBs applies separately for different TCI states. For example, the UE 115-a may assume that the same precoding is applied by the base station 105-a across all RBs within a set of contiguous RBs in the CORESET for a specific TCI state. Accordingly, RBs (e.g., contiguous RBs) of the CORESET associated with a different TCI state may correspond to a different precoding at the base station 105-a. Additionally or alternatively, in cases when the CORESET 230 has a precoder granularity configured for wideband channel estimation, the UE 115-a may expect to be configured with a set of RBs of the CORESET 230 including no more than a threshold number of non-contiguous subsets of RBs. For example, the UE 115-a may expect to be configured with a set of RBs of the CORESET 230 that includes four or fewer non-contiguous subsets of RBs in the frequency domain. In some cases, the UE 115-a may perform channel estimation of a downlink control channel over a set of frequency units based on the precoder granularity. The techniques described herein may thus enable the UE 115-a to improve the channel estimation for the downlink control channel.

Figure 3:
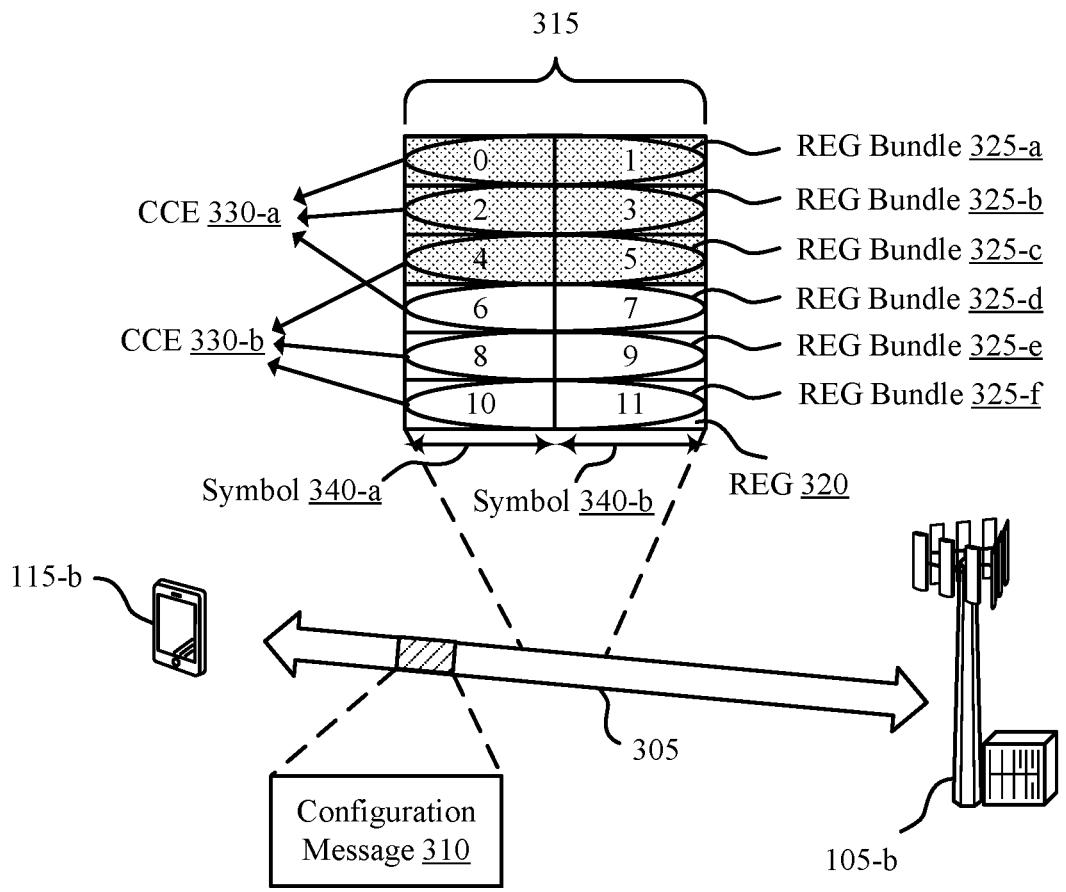

FIG. 3 illustrates an example of a wireless communications system 300 that supports TCI state-based CCE-to-REG bundle mapping in accordance with aspects of the present disclosure. In some examples, the wireless communications system 300 may implement aspects of a wireless communications systems 100 or 200. The wireless communications system 300 may include a UE 115-b and a base station 105-b, which may be examples of the corresponding devices described with reference to FIGS. 1 and 2. The base station 105-b may transmit over a control channel (e.g., via a downlink control channel, such as a PDCCH) to the UE 115-b using a communication link 305. In some examples, the wireless communications system 300 may be configured to support downlink control channel candidates associated with multiple TCI states.

The communication link 305 may include a PDCCH, a BCCH, a BCH, or any other suitable communication channel for downlink control transmissions. In some examples, the base station 105-b may transmit a configuration message 310 to the UE 115-b via higher layer control signaling (e.g., RRC signaling). The configuration message 310 may indicate configuration information for one or more aspects of the control channel, such as the CORESET 315. As described with reference to FIG. 2, the base station 105-b may transmit a DCI message on a downlink control channel over the communication link 305 and the UE 115-b may monitor for the DCI message in one or more downlink control channel (e.g., PDCCH) candidates. The UE 115-b may monitor for DCI in the PDCCH candidates in a number of CORESETs, such as CORESET 315, according to the configuration information indicated by the configuration message 310.

The CORESET 315 may include a number of RBs (e.g., frequency domain units of the CORESET 315) and a number of symbols (e.g., time domain units of the CORESET 315). The CORESET 315 may also include a number of REGs 320, where each REG 320 corresponds to one RB in one symbol 340. In some cases, REGs 320 may be numbered (e.g., indexed) in a time-first, frequency-second manner. Accordingly, two consecutively numbered REGs 320 may be located in two different symbols 340. For example, REG "0" may be located in symbol 340-a and REG "1" may be located in symbol 340-b.

In some aspects, a number L of REGs 320 of the CORESET 315 may be grouped together in a REG bundle 325, where L may also be referred to as the REG bundle size. For example, the configuration message 310 may include an indication that the CORESET 315 is configured with one or more sets of REG bundles 325, with a specific REG bundle size, or both. In some cases, each set of REG bundles 325 may be associated with a TCI state 335. As illustrated, REG bundles 325-a, 325-b, and 325-c may correspond to TCI state 335-a, and REG bundles 325-d, 325-e, and 325-f may correspond to TCI state 335-b. The TCI state 335 associated with each REG bundle 325 may be configured (e.g., via RRC signaling) or may be based on a predetermined rule (such that a first set of REG bundles is associated with a first TCI state and a second set of REG bundles is associated with a second TCI state).

A TCI state 335 may indicate parameters for configuring a QCL relationship (e.g., between reference signals and antenna ports, such as demodulation reference signal (DMRS) ports). In some implementations, multiple TCI states 335 may indicate additional parameters that support a UE 115-b determining different (e.g., a variety of) QCL properties that may enhance the diversity and reliability of a communication channel associated with the multiple TCI states 335. For example, a downlink control channel may be associated with a number of different QCL types, such as QCL types A, B, C, and D. In some cases (e.g., in FR2), the UE 115-b may use QCL type D to manage reception beams and QCL types A, B, and C may correspond to additional QCL relations. For example, the device may use a number of TCI states 335 to identify that one or more reference signals, such as a channel state information reference signal (CSI-RS), are QCLed with the CORESET 315 associated with the downlink control channel. Accordingly, the UE 115-b may manage reception beams for receiving information over the downlink control channel based on the spatial relationship between the one or more reference signals and the CORESET 315. In some aspects, the CORESET 315 may be associated with multiple TCI states, supporting communications using multiple TRPs or communications using a single TRP with multiple beams.

In some examples, one or more REG bundles 325 associated with multiple TCI states 335 may be mapped to one or more CCEs 330 associated with the CORESET 315. For example, a CCE 330 of the CORESET 315 may include 6 REGs 320, and the REGs 320 may further be grouped into REG bundles 325. In the example of FIG. 3, CCE 330-a includes REG bundles 325-a, 325-b, and 325-d, and CCE 330-b includes REG bundles 325-c, 325-e, and 325-f (e.g., based on an interleaving process). In this manner, CCE 330-a and CCE 330-b include REG bundles 325 associated with both TCI states 335-a and 335-b.

A PDCCH candidate may be associated with an aggregation level, which may indicate the number of CCEs in the PDCCH candidate. For example, a PDCCH candidate may have an aggregation level of 2 and may include 2 CCEs (e.g., CCEs 330-a and 330-b). Thus, mapping REG bundles 325 that are associated with different TCI states 335 to a CCE 330 may enable a PDCCH candidate to be associated with both TCI states 335. That is, a PDCCH candidate that includes at least CCE 330-a may be associated with resources (e.g., REGs 320 or REG bundles 325) corresponding to TCI state 335-a and TCI state 335-b.

A CCE-to-REG mapping for a CORESET may be interleaved or non-interleaved. The REG bundle size may be configured by a base station 105-b (e.g., via an RRC message, based on a predetermined rule, etc.). In some cases, the REG bundle size may be configured for the CORESET 315 based on the number of symbols 340 included in the CORESET 315. For example, in cases when the CORESET 315 includes 1 or 2 symbols 340, the REG bundle size may be 2 or 6 (e.g., a REG bundle 325 may include 2 or 6 REGs 320). In cases when the CORESET 315 includes 3 symbols 340, the REG bundle size may be 3 or 6 (e.g., a REG bundle 325 may include 3 or 6 REGs 320). In some examples (e.g., for non-interleaved CCE-to-REG mapping), the REG bundle size (e.g., L) may be equal to the CCE size (e.g., a REG bundle 325 may include 6 REGs 320). Accordingly, in such examples, one CCE may correspond to one REG bundle, and an interleaver used to interleave the mapping of REG bundles to CCEs may be an identity function (e.g., REG bundle "0" may map to CCE "0," REG bundle "1" may map to CCE "1," etc.). Alternatively (e.g., for interleaved CCE-to-REG mapping), the REG bundle size may be less than the CCE size. In some cases, the mapping between a CCE 330 and one or more REG bundles 325 may be based on the REG bundle size and an interleaving function. For example, a CCE 330 of the CORESET 315 may be mapped to a number of REG bundles 325 (e.g., interleaved REG bundles 325) based on the REG bundle size L associated with CORESET 315 and the interleaving function (e.g., to increase the frequency diversity associated with a CCE 330).

The interleaving function may depend on the REG bundle size L and an interleaver size R. In some examples, the interleaving function may also be based on a set of indices generated (e.g., by the UE 115-b, the base station 105-b, or both) for each set of REG bundles 325. For instance, the interleaving function may map a sequential set of REG bundle indices to an interleaved set of REG bundle indices for mapping to CCEs 330. In some examples, the interleaving function $f(i)$ may result in an interleaved set of REG bundle indices corresponding to a CCE 330 index j and the REG bundle size L as described in Equation 1:

$$\{f(6j/L), f(6j/L+1), \ldots, f(6j/L+6/L-1)\}, \quad (1)$$

where $f(\cdot)$ is an interleaver. In some cases, the interleaving function $f(x)$ may be defined by Equation 2:

$$f(x) = (rC + c + n_{shift}) \bmod (N_{REG}^{CORESET}/L)$$

$$x = cR + r$$

$$r = 0, 1, \ldots, R-1$$

$$c = 0, 1, \ldots, C-1$$

$$C = N_{REG}^{CORESET}/(LR), \quad (2)$$

where R is the interleaver size (e.g., the number of sets between which to interleave the REG bundles). In some cases, the first set of REG bundle indices i may correspond to a non-interleaved numbering (e.g., ordering) of REG bundles 325 of the CORESET 315. Table 1 includes an example interleaving function $f(i)$ and subsequent indices i of the REG bundles 325 where R=2.

TABLE 1

| Example Interleaving Function | | | | | | |
|---|---|---|---|---|---|---|
| i | 0 | 1 | 2 | 3 | 4 | 5 |
| f(i), R = 2 | 0 | 3 | 1 | 4 | 2 | 5 |

According to the techniques described herein, REG bundles 325 may be mapped to CCEs 330 in a manner that enables the UE 115-b to determine CCEs 330 for a PDCCH candidate based on TCI states associated with the REG bundles 325. In some cases, the CCE-to-REG mapping may be based on an interleaving function and/or on indices generated for the REG bundles 325. The UE 115-b may thus determine to use a CCE 330 for a PDCCH candidate based on the mapped REG bundles 325, such that the PDCCH candidate may be mapped to both TCI states 335. For instance, CCE 330-a includes REG bundles 325-a and 325-b that are associated with TCI state 335-a, as well as REG bundle 325-d that is associated with TCI state 335-b. Accordingly, UE 115-b may select CCE 330-a for a PDCCH candidate, as CCE 330-a corresponds to both TCI states 335. Based on including REG bundles 325 associated with multiple TCI states 335, communications using CCE 330-a may feature greater TCI state diversity and improved reliability compared to a CCE 330 associated with a single TCI state 335. For example, a DCI message received in a PDCCH candidate associated with CCE 330-a may be more likely to be successfully decoded by the UE 115-b (e.g., because the PDCCH candidate is mapped to multiple TCI states 335) than a DCI message received in a PDCCH candidate associated with a single TCI state.

In some examples, a precoder granularity for the CORESET 315 may be applied per TCI state. As described with reference to FIG. 2, the configuration message 310 may indicate that the precoder granularity for the CORESET 315 is configured for narrowband channel estimation (e.g., the precoder granularity is defined as sameAsREG-bundle) or wideband channel estimation (e.g., the precoder granularity is defined as allContiguousRBs). In the case that the precoder granularity of the CORESET 315 is for wideband channel estimation and the CORESET 315 is associated with multiple (e.g., two) TCI states 335, the UE 115-*b* may assume that all REGs 320 within a set of contiguous RBs of the CORESET 315 that correspond to the same TCI state 335 are associated with a same precoding. For example, the UE 115-*b* may assume that REGs 320 in REG bundles 325-*a* and 325-*b* are associated with the same precoding (e.g., because the REGs 320 in REG bundles 325-*a* and 325-*b* are contiguous and are all associated with TCI state 335-*a*). Additionally or alternatively, in cases when the CORESET 315 has a precoder granularity configured for wideband channel estimation, the UE 115-*b* may expect to be configured with a set of RBs of the CORESET 315 that are associated with a given TCI state 335 including no more than a threshold number of non-contiguous subsets of RBs. For example, the UE 115-*b* may expect to be configured with a set of RBs of the CORESET 315 that includes four or fewer non-contiguous subsets of RBs associated with a same TCI state 335.

Figure 4:
FIGS. 4 and 5 illustrate examples of mapping configurations that support TCI state-based CCE-to-REG bundle mapping in accordance with aspects of the present disclosure.
Figure 4:

FIG. 4 illustrates an example of a mapping configuration 400 that supports TCI state-based CCE-to-REG bundle mapping in accordance with aspects of the present disclosure. In some examples, mapping configuration 400 may implement aspects of a wireless communications system 100, 200, or 300. For example, the mapping configuration 400 may be configured for communications between a base station 105 and a UE 115. In some aspects, mapping configuration 400 may be an example of interleaving patterns and CCE-to-REG mappings for a CORESET in which a UE 115 may monitor for DCI in one or more PDCCH candidates.

Mapping configuration 400 may include REG bundle sets 401 and 402, each REG bundle set including a number (e.g., 12) of REG bundles 405. REG bundle sets 401 and 402 may be configured for a CORESET that includes 2 symbols. REG bundle sets 401-*a* and 402-*a* may correspond to REG bundle set configurations before a CCE-to-REG bundle mapping is performed, and REG bundle sets 401-*b* and 402-*b* may correspond to REG bundle set configurations after CCE-to-REG bundle mapping is performed. REG bundle set 401 may be associated with a first TCI state of the CORESET and REG bundle set 402 may be associated with a second TCI state of the CORESET.

A UE or a base station may perform a mapping operation on REG bundle sets 401 and 402 to map REG bundles 405 to one or more CCEs. For example, a UE may map a number of REG bundles 405 within REG bundle set 401 to a CCE0 and a number of REG bundles 405 within REG bundle set 402 to a CCE1. In some cases, the UE may perform the CCE-to-REG bundle mapping as described with reference to FIG. 3 (e.g., according to an interleaving function and/or based on generated indices of each REG bundle 405).

The UE may determine an index for each REG bundle in a REG bundle set such that each REG bundle set is indexed separately. That is, REG bundles associated with a first TCI state are indexed separately from REG bundles associated with a second TCI state. For instance, the UE may index REG bundles 405 within REG bundle set 401 according to Equation 3:

$$i_1 = 0, 1, \ldots, (N_{REG,1}^{CORESET}/L) - 1, \quad (3)$$

where $N_{REG,1}^{CORESET}$ is the number of REGs in the REG bundle set 401 and L is the REG bundle size. The UE may similarly index REG bundles 405 within REG bundle set 402 according to Equation 4:

$$i_2 = 0, 1, \ldots, (N_{REG,2}^{CORESET}/L) - 1, \quad (4)$$

where $N_{REG,2}^{CORESET}$ is the number of REGs in the REG bundle set 402.

Similarly, the UE may separately interleave REG bundles within each REG bundle set 401 and 402. For example, the UE may apply an interleaving function (e.g., as defined in Equation 2, with $N_{REG,1}^{CORESET}$ replacing $N_{REG}^{CORESET}$ and $f_1(x)$ replacing $f(x)$) to REG bundle set 401 separately from applying an interleaving function (e.g., as defined in Equation 2, with $N_{REG,2}^{CORESET}$ replacing $N_{REG}^{CORESET}$ and $f_2(x)$ replacing $f(x)$) to REG bundle set 402. Alternatively, the UE may perform a separate non-interleaved CCE-to-REG mapping for each REG bundle set 401 and 402 (e.g., using an identity function). Whether using an interleaving function or an identity function, the UE may map CCEs of a CORESET to REG bundles 405 from the first REG bundle set 401, the second REG bundle set 402, or both. In the example of FIG. 4, a UE may interleave the REG bundles 405 of REG bundle set 401 according to Equation 2 (e.g., where an interleaver size R=2). Thus, after interleaving, REG bundle 405 "0" becomes REG bundle 405 "0", REG bundle 405 "1" becomes REG bundle 405 "6", REG bundle 405 "2" becomes REG bundle 405 "1", and so on, as illustrated. The UE may separately apply the interleaving function to the REG bundles 405 of the REG bundle set 402.

The UE may perform a CCE-to-REG mapping to map the REG bundles 405 to one or more CCEs (e.g., CCE0 and/or CCE1). Each CCE may include REG bundles based on the index j of the CCE and the REG bundle size L, as described with reference to Equation 1. For example, if j is even (e.g., j=2k), the CCE may include REG bundles 405 from the first REG bundle set 401, and if j is odd (e.g., j=2k+1), the CCE may include REG bundles 405 from the second REG bundle set 402.

In the example of FIG. 4, the UE may separately interleave REG bundles 405 of REG bundle sets 401 and 402 (e.g., according to Equation 2) and map REG bundles 405 to CCE0 and CCE1. For instance, because j=0 and thus j is even for CCE0, CCE0 includes REG bundles 405 "0", "1", and "6" from the first REG bundle set 401 (e.g., according to Equation 1 and the interleaving). Similarly, because j=1 and thus j is odd for CCE1, CCE1 includes REG bundles "0", "1", and "6" from the second REG bundle set 402 (e.g., according to Equation 1 and the interleaving).

In some cases, the frequency separation between the REG bundles 405 of CCE0 in REG bundle set 401-*b* and the REG bundles 405 of CCE1 in REG bundle set 402-*b* may provide for more reliable communications based on increased channel bandwidth. Moreover, the techniques described herein may enable a PDCCH candidate with at least two CCEs to include REG bundles 405 from REG bundle sets associated with multiple TCI states. Based on including REG bundles 405 from REG bundle sets associated with multiple TCI states, communications using such CCEs may feature greater TCI state diversity and improved reliability compared to a CCE associated with a single TCI state. For example, a PDCCH candidate may include both CCE0 and CCE1 and thus may include REG bundles 405 associated with both TCI states. Accordingly, a DCI message received in a PDCCH candidate that includes both CCE0 and CCE1 may be more likely to be successfully decoded by a UE 115 (e.g., because the PDCCH candidate is mapped to multiple TCI states) than a DCI message received in a PDCCH candidate associated with a single TCI state. Additionally or alternatively, such a PDCCH candidate may support increased flexibility at a base station 105 to transmit DCI using one or multiple TCI states.

Figure 5:
Figure 5:

FIG. 5 illustrates an example of a mapping configuration 500 that supports TCI state-based CCE-to-REG bundle mapping in accordance with aspects of the present disclosure. In some examples, mapping configuration 500 may implement aspects of a wireless communications system 100, 200, or 300. For example, the mapping configuration 500 may be configured for communications between a base station 105 and a UE 115. In some aspects, mapping configuration 500 may be an example of interleaving patterns and CCE-to-REG mapping for a CORESET in which a UE 115 may monitor a downlink control channel for DCI.

Mapping configuration 500 may include REG bundle sets 501 and 502, each REG bundle set including a number (e.g., 12) of REG bundles 505. REG bundle sets 501-*a* and 502-*a* may correspond to REG bundle set configurations before a CCE-to-REG bundle mapping is performed, and REG bundle sets 501-*b* and 502-*b* may correspond to REG bundle set configurations after CCE-to-REG bundle mapping is performed. REG bundle set 501 may be associated with a first TCI state, and REG bundle set 502 may be associated with a second TCI state. A UE or a base station may perform a mapping operation on REG bundle sets 501 and 502 to map REG bundles 505 to one or more CCEs. In some cases, the UE may perform the CCE-to-REG bundle mapping as described with reference to FIG. 3 (e.g., according to an interleaving function and/or based on generated indices of each REG bundle 505).

The UE may determine an index for each REG bundle in a REG bundle set such that each REG bundle set is indexed separately. For instance, the UE may index REG bundles 505 within REG bundle set 501 according to Equation 3. The UE may similarly index REG bundles 505 within REG bundle set 502 according to Equation 4.

Similarly, the UE may separately interleave REG bundles within each REG bundle set 501 and 502. For example, the UE may apply an interleaving function (e.g., as defined in Equation 2 with $N_{REG,1}^{CORESET}$ replacing $N_{REG}^{CORESET}$ and $f_1(x)$ replacing $f(x)$) to REG bundle set 501 separately from applying an interleaving function (e.g., as defined in Equation 2, with $N_{REG,2}^{CORESET}$ replacing $N_{REG}^{CORESET}$ and $f_2(x)$ replacing $f(x)$) to REG bundle set 502. Alternatively, the UE may perform a separate non-interleaved CCE-to-REG mapping for each REG bundle set 501 and 502. Whether using an interleaving function or an identity function, the UE may map CCEs of a CORESET to REG bundles 505 from the first REG bundle set 501, the second REG bundle set 502, or both.

The UE may perform a CCE-to-REG mapping to map some REG bundles 505 to one or more CCEs (e.g., CCE0 and/or CCE1). Each CCE may include REG bundles based on the index j of the CCE and the REG bundle size L. For example, in some cases, a CCE may include REG bundles 505 from REG bundle set 501 or REG bundle set 502 (e.g., as described with reference to FIG. 4), but not both. In other cases, a CCE may include REG bundles 505 from both REG bundle set 501 and REG bundle set 502. For example, each CCE may include $$n = \frac{6}{L}$$

REG bundles 505. For multiple REG bundle sets x, n may be the number of REG bundles in a CCE. For example, if x=2, then n=$n_1$+$n_2$, where $$n_1 = \left\lceil \frac{n}{2} \right\rceil = \left\lceil \frac{3}{L} \right\rceil, \text{ and}$$

$$n_2 = \left\lfloor \frac{n}{2} \right\rfloor = \left\lfloor \frac{3}{L} \right\rfloor.$$

In some cases, n may be 1, 2, or 3 (e.g., based on the REG bundle size). If j is even (e.g., j=2k), the CCE may include REG bundles 505 from a REG bundle set x according to Equation 5:

$$\{f_x(6k/L), \ldots, f_x(6k/L+n_x-1)\}, \quad (5)$$

for each of the REG bundle sets. If j is odd (e.g., j=2k+1), the CCE may include REG bundles 505 from a REG bundle set x according to Equation 6:

$$\left\{ f_x\left(\frac{6k}{L} + n_x\right), \ldots, f_x(6k/L + 6/L - 1) \right\}, \quad (6)$$

for each of the REG bundle sets.

In the example of FIG. 5, the UE separately interleaves REG bundles 505 of REG bundle sets 501 and 502 (e.g., according to Equation 2) and maps REG bundles 505 from both REG bundle set 501 and REG bundle set 502 to CCE0 and CCE1. For instance, because j=0 and thus j is even for CCE0, CCE0 includes REG bundles 505 "0" and "6" from the first REG bundle set 501 and REG bundle 505 "0" from the second REG bundle set 502 (e.g., according to Equation 5 and the interleaving). Similarly, because j=1 and thus j is odd for CCE1, CCE1 includes REG bundle 505 "1" from the first REG bundle set 501 and REG bundles 505 "1" and "6" from the second REG bundle set 502 (e.g., according to Equation 6 and the interleaving).

In some cases, the frequency separation between the REG bundles 505 of CCE0 and the REG bundles 505 of CCE1 may provide for more reliable communications based on increased channel bandwidth. Moreover, the techniques described herein may enable a CCE to include REG bundles 505 associated with multiple TCI states. Based on including REG bundles 505 from REG bundle sets associated with multiple TCI states, communications using such CCEs may feature greater TCI state diversity and improved reliability compared to a CCE associated with a single TCI state. For example, a PDCCH candidate may include CCE0, which (in the example of FIG. 5) is mapped to REG bundles 505 associated with both TCI states. Thus, a DCI message received in a PDCCH candidate associated with CCE0 may be more likely to be successfully decoded by a UE 115 (e.g., because the PDCCH candidate is mapped to multiple TCI states) than a DCI message received in a PDCCH candidate associated with a single TCI state. Additionally or alternatively, such a PDCCH candidate may support increased flexibility at a base station 105 to transmit DCI using one or multiple TCI states.

In some examples, a REG bundle may have a size of six, where a CCE is mapped to a single REG bundle. Accordingly, the operations described with reference to FIGS. 4 and 5 may result in a same mapping.

Figure 6:
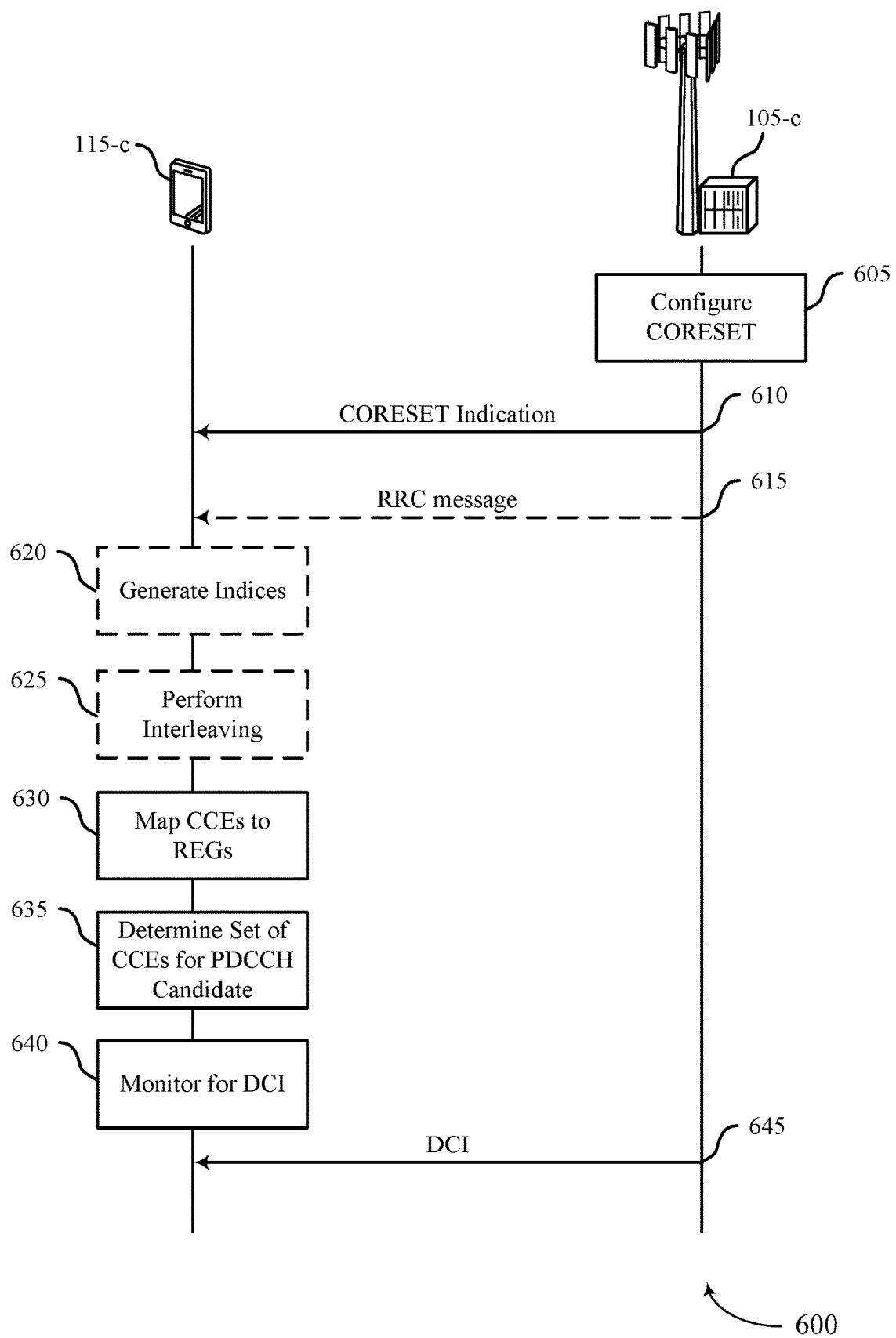
FIGS. 6 and 7 illustrate examples of process flows that support TCI state-based CCE-to-REG bundle mapping in accordance with aspects of the present disclosure.

FIG. 6 illustrates an example of a process flow 600 that supports TCI state-based CCE-to-REG bundle mapping in accordance with aspects of the present disclosure. In some examples, process flow 600 may implement aspects of a wireless communications systems 100, 200, or 300. The process flow 600 may include a UE 115-*c* and a base station 105-*c*, which may be examples of the corresponding devices described with reference to FIGS. 1 through 3. The UE 115-c and the base station 105-c may implement one or more techniques supporting reliable downlink control channel communications by configuring a CORESET associated with a downlink control channel to include resources (e.g., REG bundles) associated with multiple TCI states.

In the following description of the process flow 600, the operations between the base station 105-c and the UE 115-c may be performed in a different order than the example order shown, or the operations performed by the base station 105-c and the UE 115-c may be performed in different orders or at different times. Some operations may also be omitted from the process flow 600, and other operations may be added to the process flow 600. Further, although process flow 600 describes a base station 105-c and a UE 115-c, it should be noted that the operations of process flow 600 may be performed by any device.

At 605, the base station 105-c may configure a CORESET with one or more sets of REG bundles, and each REG bundle of each set of REG bundles may include a number of REGs (e.g., based on a REG bundle size). For example, each REG bundle may include one REG, two REGs, three REGs, or six REGs. Each set of REG bundles may be associated with a TCI state. For example, a first set of REG bundles may be associated with a first TCI state and a second set of REG bundles may be associated with a second TCI state. Specifically, the CORESET may be associated with two active TCI states in an FDM manner, where the TCI state per REG bundle may be determined based on a pre-determined rule (e.g., the first half of REG bundles may be associated with the first TCI state and the second half of REG bundles may be associated with the second TCI state, even REG bundles may be associated with the first TCI state and odd REG bundles may be associated with the second TCI state, etc.) or may be configured for the CORESET (e.g., based on an RRC message transmitted by the base station 105-c, for example, at 610 or 615).

At 610, the base station 105-c may transmit an indication of the CORESET to the UE 115-c. In some examples, the UE 115-c may determine a TCI state mapping for the sets of REG bundles based on a TCI state mapping rule (e.g., stored in memory of the UE 115-c).

At 615, the base station 105-c may transmit an RRC message to the UE 115-c. The RRC message may indicate a CCE mapping rule. In some cases, the RRC message may configure the first set of REG bundles with the first TCI state and the second set of REG bundles with the second TCI state. Additionally or alternatively, the RRC message may indicate the REG bundle size, which may be based on a number of symbols of the CORESET.

At 620, the UE 115-c may generate indices for each set of REG bundles (e.g., for each REG bundle in the set of REG bundles).

At 625, the UE 115-c may perform interleaving on the sets of REG bundles. For example, the UE 115-c may interleave the first set of REG bundles and the second set of REG bundles separately according to an interleaving function (e.g., Equation 2). In some cases, the UE 115-c may refrain from interleaving the first and/or second set of REG bundles based on applying an identity function to each set of REG bundles.

At 630, the UE 115-c may map each CCE of the CORESET to one or more REG bundles of the first set of REG bundles, the second set of REG bundles, or both. In some aspects, the UE 115-c may perform the mapping according to a mapping rule (e.g., received at 615, stored in memory of the UE 115-c, etc.). In some examples, the mapping may be based on the indices generated at 620, the interleaving performed (or refrained from being performed) at 625, or both. For example, a first CCE of the CORESET may be mapped to one or more REG bundles of the first set of REG bundles based on an index of the first CCE (e.g., where the index of the first CCE is even) and a second CCE may be mapped to one or more REG bundles of the second set of REG bundles based on an index of the second CCE (e.g., where the index of the second CCE is odd). Alternatively, the UE 115-c may map the first CCE to one or more REG bundles of the first set of REG bundles and one or more REG bundles of the second set of REG bundles. In some examples, the UE 115-c may alternate mapping the CCE to a respective REG bundle of the first set of REG bundles and to a respective REG bundle of the second set of REG bundles.

At 635, the UE 115-c may determine a set of CCEs for a PDCCH candidate based on the mapping performed at 630. The set of CCEs may include at least a first REG bundle of the first set of REG bundles (e.g., associated with the first TCI state) and at least a second REG bundle of the second set of REG bundles (e.g., associated with the second TCI state). For example, the set of CCEs may include at least the first CCE mapped to one or more REG bundles of the first set of REG bundles and the second CCE mapped to one or more REG bundles of the second set of REG bundles at 630. Additionally or alternatively, the set of CCEs may include at least the CCE mapped to one or more REG bundles of the first and second set of REG bundles at 630. In some cases, the PDCCH candidate may be associated with an aggregation level, and the number of CCEs determined at 635 may be equal to the aggregation level.

At 640, the UE 115-c may monitor for a DCI message in the PDCCH candidate associated with the CORESET based on the set of CCEs determined at 635. In some examples, at 645, the UE 115-c may receive the DCI message in the PDCCH candidate according to the first TCI state and the second TCI state. The UE 115-c may receive the DCI message based on the set of CCEs determined at 635. For example, the set of CCEs may include at least the first REG bundle associated with the first TCI state and at least the second REG bundle associated with the second TCI state. In some examples, the DCI message may be transmitted without repetition, such that one encoding and rate matching process is performed for a PDCCH candidate with two TCI states.

In some cases, the base station 105-c may perform one or more operations described in the process flow 600 as being performed by the UE 115-c. For example, the base station 105-c may perform the operations described at 620 through 635 and may transmit the DCI at 645 accordingly.

Figure 7:
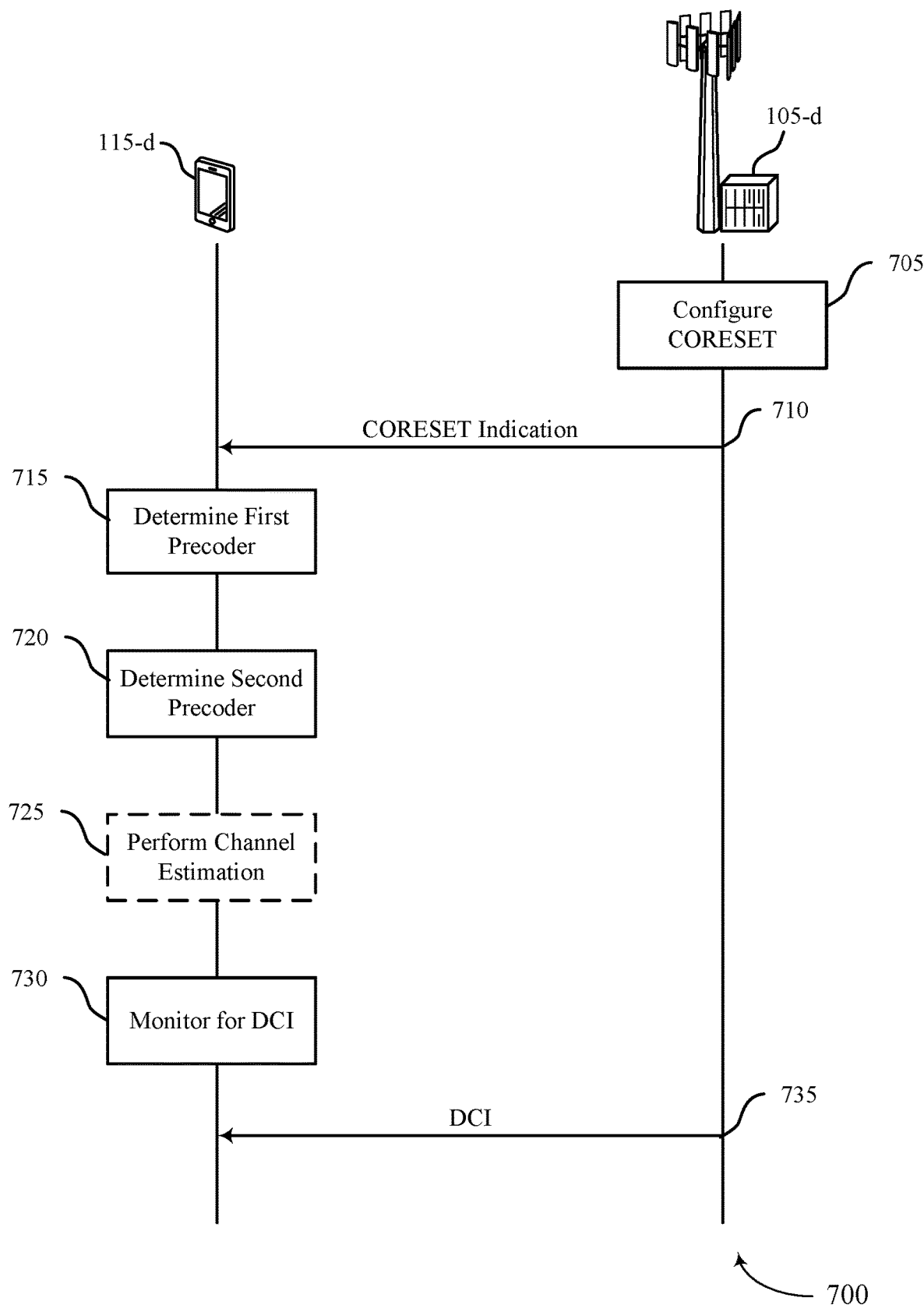

FIG. 7 illustrates an example of a process flow 700 that supports TCI state-based CCE-to-REG bundle mapping in accordance with aspects of the present disclosure. In some examples, process flow 700 may implement aspects of a wireless communications system 100, 200, or 300. The process flow 700 may include a UE 115-d and a base station 105-d, which may be examples of the corresponding devices described with reference to FIGS. 1 through 3. The UE 115-d and the base station 105-d may implement one or more techniques supporting reliable downlink control channel communications by handling precoder granularities across TCI states of a CORESET configured with multiple TCI states.

In the following description of the process flow 700, the operations between the base station 105-d and the UE 115-d may be performed in a different order than the example order shown, or the operations performed by the base station 105-*d* and the UE 115-*d* may be performed in different orders or at different times. Some operations may also be omitted from the process flow 700, and other operations may be added to the process flow 700. Further, although process flow 700 describes a base station 105-*d* and a UE 115-*d*, it should be noted that the operations of process flow 700 may be performed by any device.

At 705, the base station 105-*d* may configure a CORESET with one or more sets of REG bundles, and each REG bundle of each set of REG bundles may include a number of REGs (e.g., based on a REG bundle size). For example, each REG bundle may include one REG, two REGs, three REGs, or six REGs. Each set of REG bundles may be associated with a TCI state. For example, a first set of REG bundles may be associated with a first TCI state and a second set of REG bundles may be associated with a second TCI state. The base station 105-*d* may also configure the CORESET with a precoding granularity set to all contiguous resource blocks. In some examples, the base station 105-*d* may configure a precoding granularity for the CORESET based on a channel estimation process to be performed by the UE 115-*d*. In some cases, the channel estimation process performed by the UE 115-*d* may be associated with wideband channel estimation (e.g., precoder granularity is configured as allContiguousRBs) or narrowband channel estimation (e.g., precoder granularity is configured as sameAsREG-bundle).

In some examples, the base station 105-*d* may configure the sets of REG bundles to include up to a threshold number (e.g., four) of non-contiguous subsets of RBs associated with a same TCI state. For example, the first set of REG bundles may be configured to include up to four non-contiguous subsets of RBs, and the second set of REG bundles may be configured to include up to four additional subsets of non-contiguous RBs.

At 710, the base station 105-*d* may transmit, and the UE 115-*d* may receive, an indication of the CORESET. The indication may be transmitted as part of an RRC message, a MAC-CE, or both. The CORESET indication may further indicate the precoder granularity for the CORESET.

At 715, the UE 115-*d* may determine that a first precoder is applied across the first set of REG bundles (e.g., associated with the first TCI state). The determination may be made based on the precoding granularity being set to all contiguous resource blocks (e.g., as indicated in the CORESET indication received at 710) and the CORESET including multiple TCI states (e.g., in an FDM manner).

At 720, the UE 115-*d* may determine that a second precoder is applied across the second set of REG bundles (e.g., associated with the second TCI state). The determination may be made based on the precoding granularity being set to all contiguous resource blocks (e.g., as indicated in the CORESET indication received at 710) and the CORESET including multiple TCI states (e.g., in an FDM manner).

At 725, the UE 115-*d* may perform channel estimation across the sets of REG bundles. For example, the UE 115-*d* may perform a first joint channel estimation across the first set of REG bundles (e.g., associated with the first TCI state) based on the determination performed at 715. The UE 115-*d* may perform a second joint channel estimation across the second set of REG bundles (e.g., associated with the second TCI state) based on the determination performed at 720.

At 730, the UE 115-*d* may monitor for a DCI message in a PDCCH candidate associated with the CORESET (e.g., indicated at 710). The UE 115-*d* may monitor for the DCI based on the determination performed at 715, the determination performed at 720, or both.

At 735, the base station 105-*d* may transmit, and the UE 115-*d* may receive, a DCI message in a PDCCH associated with the CORESET (e.g., indicated at 710) based on the first precoder, the second precoder, or both. For example, the base station 105-*d* may transmit the DCI message using a precoder according to the indicated precoder granularity, and the UE 115-*d* may receive the DCI message based on an assumption about the precoder according to the indicated precoder granularity.

In some cases, the base station 105-*d* may perform one or more operations described in the process flow 700 as being performed by the UE 115-*d*. For example, the base station 105-*d* may determine to use a first precoder and a second precoder different from the first precoder (e.g., as described at 715 and 720, respectively), and may transmit the DCI at 735 accordingly.

Figure 8:
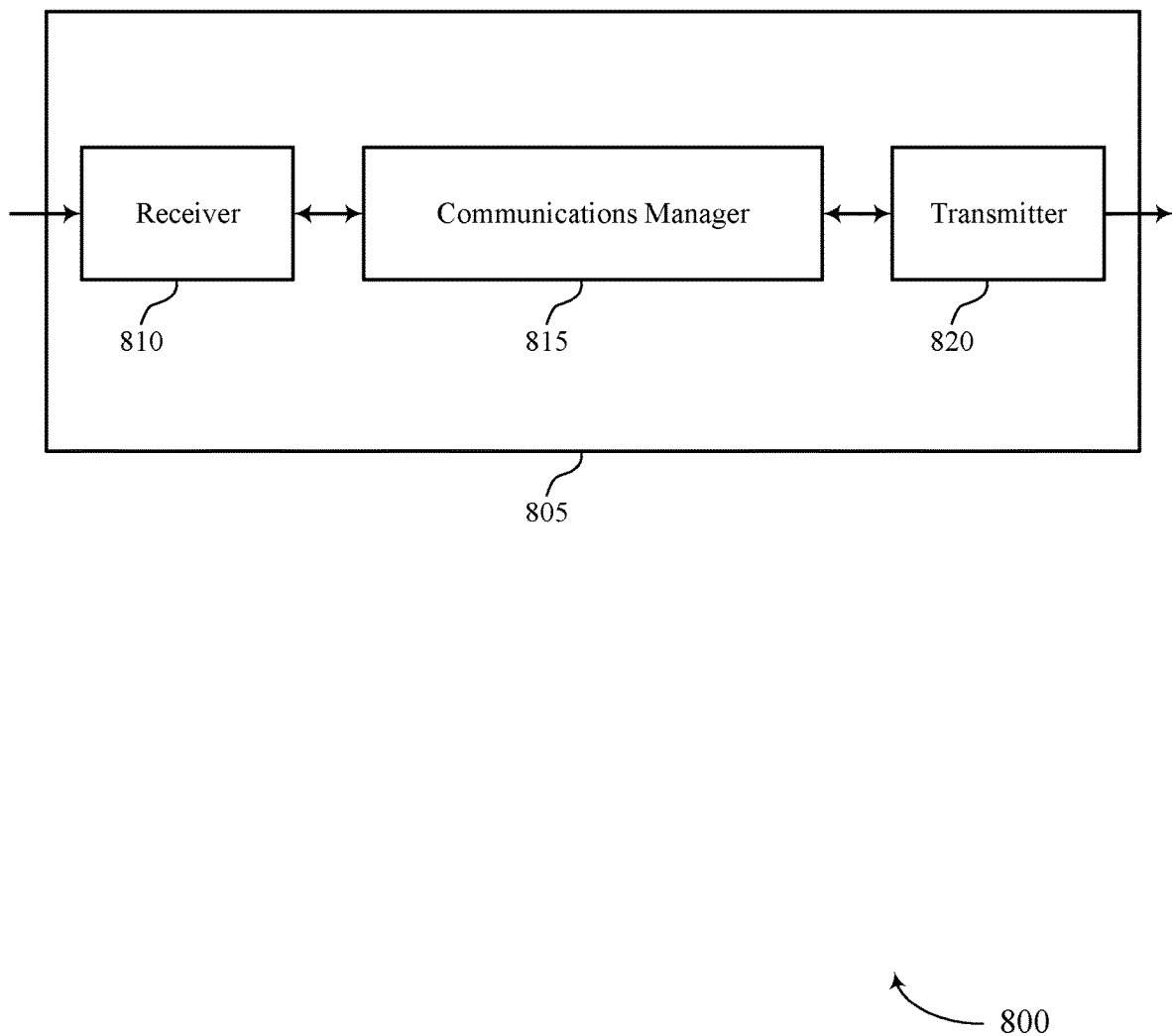
FIGS. 8 and 9 show block diagrams of devices that support TCI state-based CCE-to-REG bundle mapping in accordance with aspects of the present disclosure.

FIG. 8 shows a block diagram 800 of a device 805 that supports TCI state-based CCE-to-REG bundle mapping in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information channels related to TCI state-based CCE-to-REG bundle mapping, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive an indication of a CORESET configured with a first set of REG bundles associated with a first TCI state and a second set of REG bundles associated with a second TCI state and may map each CCE of the CORESET to one or more first REG bundles of the first set of REG bundles, one or more second REG bundles of the second set of REG bundles, or both. The communications manager 815 may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state and may monitor for a DCI message in the PDCCH candidate associated with the CORESET based on the set of CCEs.

Additionally or alternatively, the communications manager 815 may receive an indication of a CORESET configured with a first set of REG bundles associated with a first TCI state, a second set of REG bundles associated with a second TCI state, and a precoding granularity set to all contiguous resource blocks. The communications manager 815 may determine that a first precoder is applied across the first set of REG bundles associated with the first TCI state based on the precoding granularity being set to all contiguous resource blocks, determine that a second precoder is applied across the second set of REG bundles associated with the second TCI state based on the precoding granularity being set to all contiguous resource blocks, and monitor for a DCI message in a PDCCH candidate associated with the CORESET based on the determination that the first precoder is applied across the first set of REG bundles, the determination that the second precoder is applied across the second set of REG bundles, or both. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 815 in accordance with examples as described herein, the device 805 (e.g., a processor controlling or otherwise coupled with the receiver 810, the transmitter 820, the communications manager 815, or a combination thereof) may support techniques for enhancing TCI state diversity, which may in turn improve reliability of control channels (e.g., a PDCCH). For example, the device 805 may receive a DCI message in a PDCCH candidate associated with multiple TCI states, which may increase the likelihood that the device 805 successfully decodes the PDCCH candidate. Such techniques may avoid retransmissions and increase communication efficiency, which may also reduce power consumption and increase battery life at the device 805.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
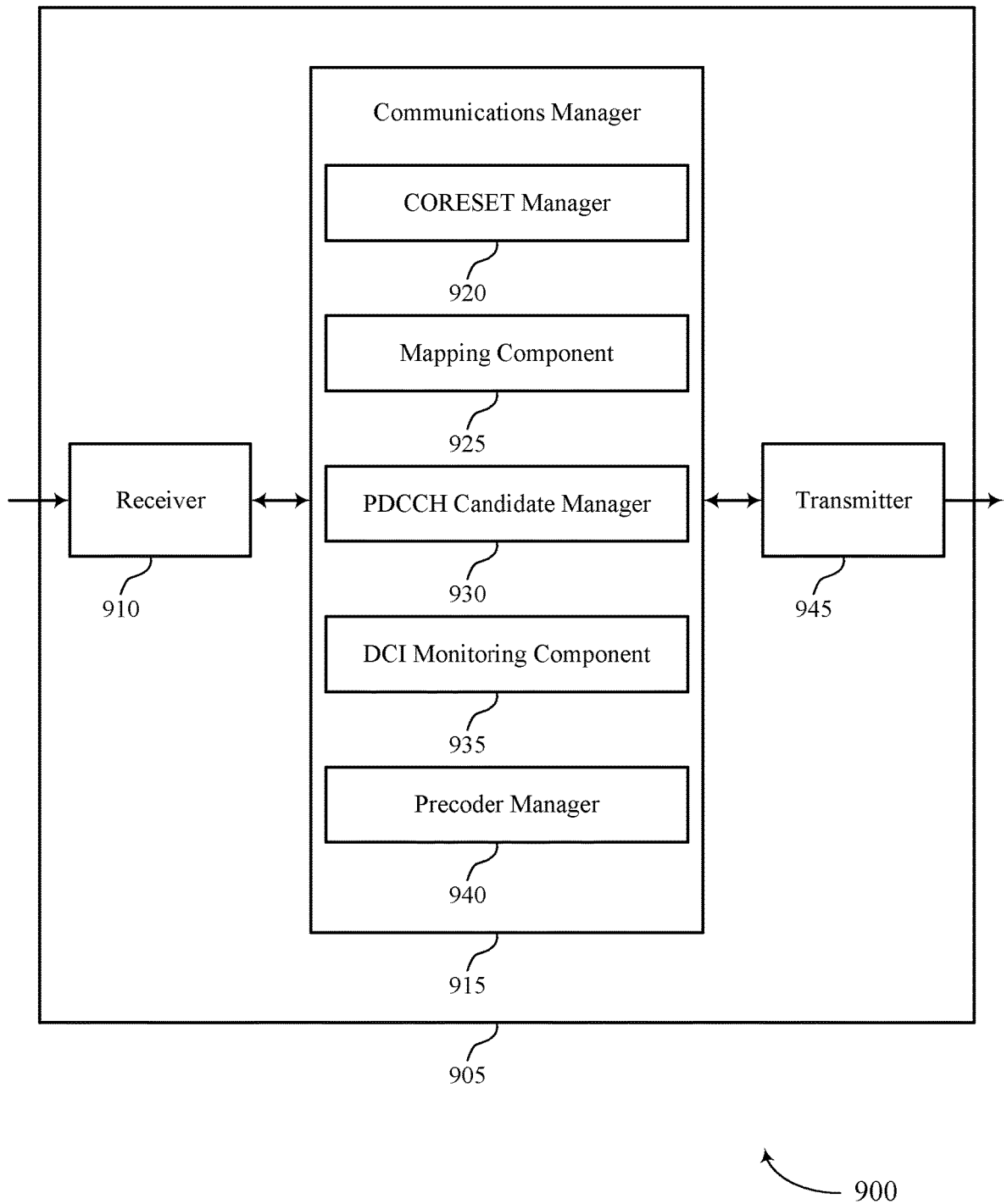

FIG. 9 shows a block diagram 900 of a device 905 that supports TCI state-based CCE-to-REG bundle mapping in accordance with aspects of the present disclosure. The device 905 may be an example of aspects of a device 805 or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information channels related to TCI state-based CCE-to-REG bundle mapping, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a CORESET manager 920, a mapping component 925, a PDCCH candidate manager 930, a DCI monitoring component 935, a precoder manager 940, or any combination thereof. The communications manager 915 may be an example of aspects of the communications manager 1110 described herein.

The CORESET manager 920 may receive an indication of a CORESET configured with a first set of REG bundles associated with a first TCI state and a second set of REG bundles associated with a second TCI state. The mapping component 925 may map each CCE of the CORESET to one or more first REG bundles of the first set of REG bundles, one or more second REG bundles of the second set of REG bundles, or both. The PDCCH candidate manager 930 may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state. The DCI monitoring component 935 may monitor for a DCI message in the PDCCH candidate associated with the CORESET based on the set of CCEs.

The CORESET manager 920 may receive an indication of a CORESET configured with a first set of REG bundles associated with a first TCI state, a second set of REG bundles associated with a second TCI state, and a precoding granularity set to all contiguous resource blocks. The precoder manager 940 may determine that a first precoder is applied across the first set of REG bundles associated with the first TCI state based on the precoding granularity being set to all contiguous resource blocks and determine that a second precoder is applied across the second set of REG bundles associated with the second TCI state based on the precoding granularity being set to all contiguous resource blocks. The DCI monitoring component 935 may monitor for a DCI message in a PDCCH candidate associated with the CORESET based on the determination that the first precoder is applied across the first set of REG bundles, the determination that the second precoder is applied across the second set of REG bundles, or both.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
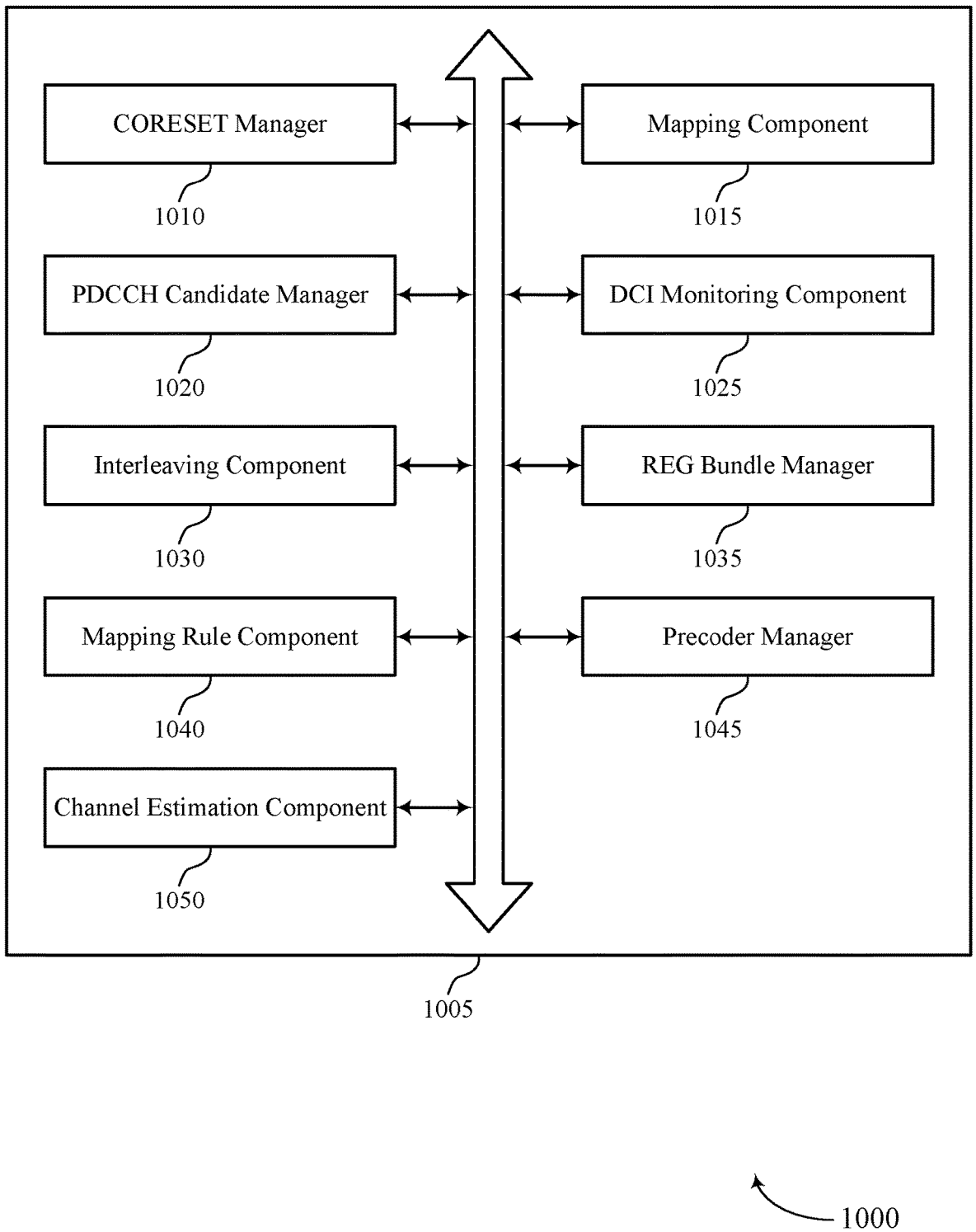
FIG. 10 shows a block diagram of a communications manager that supports TCI state-based CCE-to-REG bundle mapping in accordance with aspects of the present disclosure.

FIG. 10 shows a block diagram 1000 of a communications manager 1005 that supports TCI state-based CCE-to-REG bundle mapping in accordance with aspects of the present disclosure. The communications manager 1005 may be an example of aspects of a communications manager 815, a communications manager 915, or a communications manager 1110 described herein. The communications manager 1005 may include a CORESET manager 1010, a mapping component 1015, a PDCCH candidate manager 1020, a DCI monitoring component 1025, an interleaving component 1030, a REG bundle manager 1035, a mapping rule component 1040, a precoder manager 1045, a channel estimation component 1050, or any combination thereof. Each of these modules may communicate, directly or indirectly, with one another (e.g., via one or more buses).

The CORESET manager 1010 may receive an indication of a CORESET configured with a first set of REG bundles associated with a first TCI state and a second set of REG bundles associated with a second TCI state. In some examples, the CORESET manager 1010 may receive an indication of a CORESET configured with a first set of REG bundles associated with a first TCI state, a second set of REG bundles associated with a second TCI state, and a precoding granularity set to all contiguous resource blocks.

In some examples, the CORESET manager 1010 may receive an RRC message including the indication of the CORESET.

The mapping component 1015 may map each CCE of the CORESET to one or more first REG bundles of the first set of REG bundles, one or more second REG bundles of the second set of REG bundles, or both. In some examples, the mapping component 1015 may map a first CCE of the CORESET to the one or more first REG bundles of the first set of REG bundles based on a first index of the first CCE. In some examples, the mapping component 1015 may map a second CCE of the CORESET to the one or more second REG bundles of the second set of REG bundles based on a second index of the second CCE, where the set of CCEs for the PDCCH candidate includes at least the first CCE and the second CCE. In some examples, the mapping component 1015 may map a first CCE of the CORESET to the one or more first REG bundles of the first set of REG bundles and the one or more second REG bundles of the second set of REG bundles, where the set of CCEs for the PDCCH candidate includes at least the first CCE. In some examples, the mapping component 1015 may alternate mapping the first CCE to a respective REG bundle of the first set of REG bundles and to a respective REG bundle of the second set of REG bundles.

In some cases, the first CCE is mapped to the one or more first REG bundles of the first set of REG bundles based on the first index being even. In some cases, the second CCE is mapped to the one or more second REG bundles of the second set of REG bundles based on the second index being odd.

The PDCCH candidate manager 1020 may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state. In some cases, the PDCCH candidate corresponds to an aggregation level. In some cases, the set of CCEs for the PDCCH candidate includes a number of CCEs equal to the aggregation level.

The DCI monitoring component 1025 may monitor for a DCI message in the PDCCH candidate associated with the CORESET based on the set of CCEs. In some examples, the DCI monitoring component 1025 may receive, based on the monitoring, the DCI message in the PDCCH candidate according to the first TCI state and the second TCI state based on the set of CCEs for the PDCCH candidate including at least the first REG bundle associated with the first TCI state and at least the second REG bundle associated with the second TCI state.

The precoder manager 1045 may determine that a first precoder is applied across the first set of REG bundles associated with the first TCI state based on the precoding granularity being set to all contiguous resource blocks. In some examples, the precoder manager 1045 may determine that a second precoder is applied across the second set of REG bundles associated with the second TCI state based on the precoding granularity being set to all contiguous resource blocks.

In some examples, the DCI monitoring component 1025 may monitor for a DCI message in a PDCCH candidate associated with the CORESET based on the determination that the first precoder is applied across the first set of REG bundles, the determination that the second precoder is applied across the second set of REG bundles, or both.

The interleaving component 1030 may interleave the first set of REG bundles associated with the first TCI state according to an interleaver function. In some examples, the interleaving component 1030 may separately interleave the second set of REG bundles associated with the second TCI state according to the interleaver function, where the mapping is performed based on the interleaved first set of REG bundles and the separately interleaved second set of REG bundles. In some examples, the interleaving component 1030 may refrain from interleaving the first set of REG bundles associated with the first TCI state based on applying an identity function to the first set of REG bundles. In some examples, the interleaving component 1030 may refrain from interleaving the second set of REG bundles associated with the second TCI state based on applying the identity function to the second set of REG bundles, where the mapping is performed based on refraining from interleaving the first set of REG bundles and refraining from interleaving the second set of REG bundles.

The REG bundle manager 1035 may generate a first set of indices for the first set of REG bundles associated with the first TCI state. In some examples, the REG bundle manager 1035 may separately generate a second set of indices for the second set of REG bundles associated with the second TCI state.

In some examples, the REG bundle manager 1035 may receive an RRC message configuring the first set of REG bundles with the first TCI state and the second set of REG bundles with the second TCI state. In some examples, the REG bundle manager 1035 may receive an RRC message indicating the REG bundle size, where the REG bundle size is based on a number of symbols of the CORESET.

In some cases, each REG bundle of the first set of REG bundles and the second set of REG bundles includes a number of REGs based on a REG bundle size. In some cases, the number of REGs in each REG bundle includes one REG, two REGs, three REGs, or six REGs.

In some cases, the first set of REG bundles is configured to include up to four subsets of RBs of the CORESET that are non-contiguous in a frequency domain. In some cases, the second set of REG bundles is configured to include up to four additional subsets of RBs of the CORESET that are non-contiguous in the frequency domain.

The mapping rule component 1040 may receive an RRC message indicating a CCE mapping rule, where the mapping is based on the CCE mapping rule. In some examples, the mapping rule component 1040 may store, in memory, a CCE mapping rule, where the mapping is based on the CCE mapping rule. In some examples, the mapping rule component 1040 may store, in memory, a TCI state mapping rule configuring the first set of REG bundles with the first TCI state and the second set of REG bundles with the second TCI state.

The channel estimation component 1050 may perform a first joint channel estimation across the first set of REG bundles associated with the first TCI state based on the determination that the first precoder is applied across the first set of REG bundles. In some examples, the channel estimation component 1050 may perform a second joint channel estimation across the second set of REG bundles associated with the second TCI state based on the determination that the second precoder is applied across the second set of REG bundles.

Figure 11:
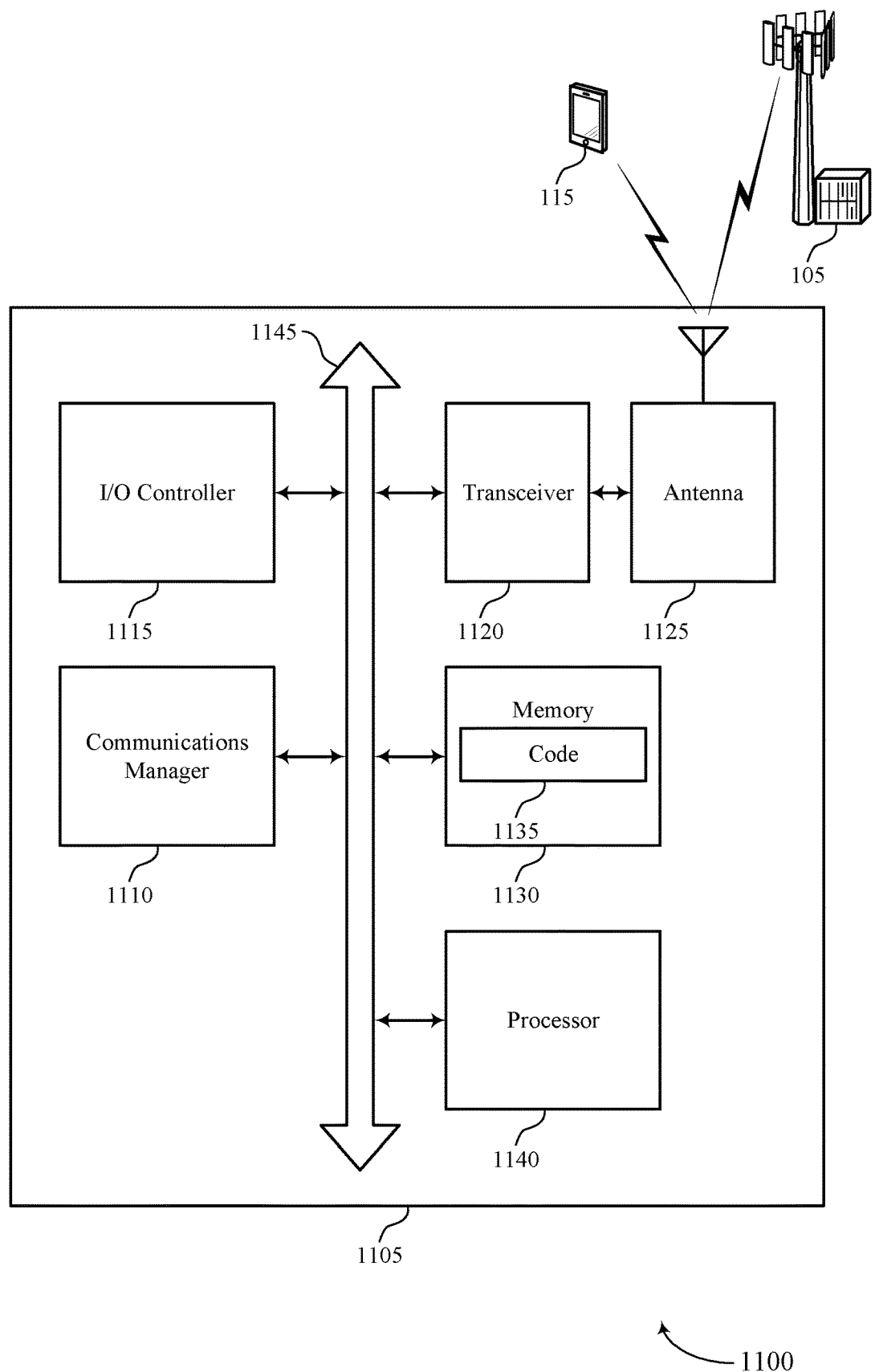
FIG. 11 shows a diagram of a system including a device that supports TCI state-based CCE-to-REG bundle mapping in accordance with aspects of the present disclosure.

FIG. 11 shows a diagram of a system 1100 including a device 1105 that supports TCI state-based CCE-to-REG bundle mapping in accordance with aspects of the present disclosure. The device 1105 may be an example of or include the components of a device 805, a device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive an indication of a CORESET configured with a first set of REG bundles associated with a first TCI state and a second set of REG bundles associated with a second TCI state, and may map each CCE of the CORESET to one or more first REG bundles of the first set of REG bundles, one or more second REG bundles of the second set of REG bundles, or both. The communications manager 1110 may also determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and monitor for a DCI message in the PDCCH candidate associated with the CORESET based on the set of CCEs. Additionally or alternatively, the communications manager 1110 may receive an indication of a CORESET configured with a first set of REG bundles associated with a first TCI state, a second set of REG bundles associated with a second TCI state, and a precoding granularity set to all contiguous resource blocks. The communications manager 1110 may also determine that a first precoder is applied across the first set of REG bundles associated with the first TCI state based on the precoding granularity being set to all contiguous resource blocks, determine that a second precoder is applied across the second set of REG bundles associated with the second TCI state based on the precoding granularity being set to all contiguous resource blocks, and monitor for a DCI message in a PDCCH candidate associated with the CORESET based on the determination that the first precoder is applied across the first set of REG bundles, the determination that the second precoder is applied across the second set of REG bundles, or both.

In some examples, the communications manager 1110 may be configured to perform various operations (e.g., receiving, monitoring, transmitting) using or otherwise in cooperation with the transceiver 1120, the one or more antennas 1125, or any combination thereof. For example, the communications manager 1110 may be configured to monitor for, receive, or transmit messages or other signaling as described herein via the transceiver 1120.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting TCI state-based CCE-to-REG bundle mapping).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

By including or configuring the communications manager 1110 in accordance with examples as described herein, the device 1105 may support techniques for enhancing TCI state diversity, which may in turn improve reliability of control channels (e.g., a PDCCH). For example, the device 1105 may receive a DCI message in a PDCCH candidate associated with multiple TCI states. The device 1105 may improve channel estimation for the PDCCH based on the increased TCI state diversity, which may in turn enhance the ability of the device 1105 to accurately manage different reception beams associated with the PDCCH. Additionally, the device 1105 may receive CCEs including REG bundles that are separated in the frequency domain, which may increase channel bandwidth and further increase communication efficiency and reliability.

Figure 12:
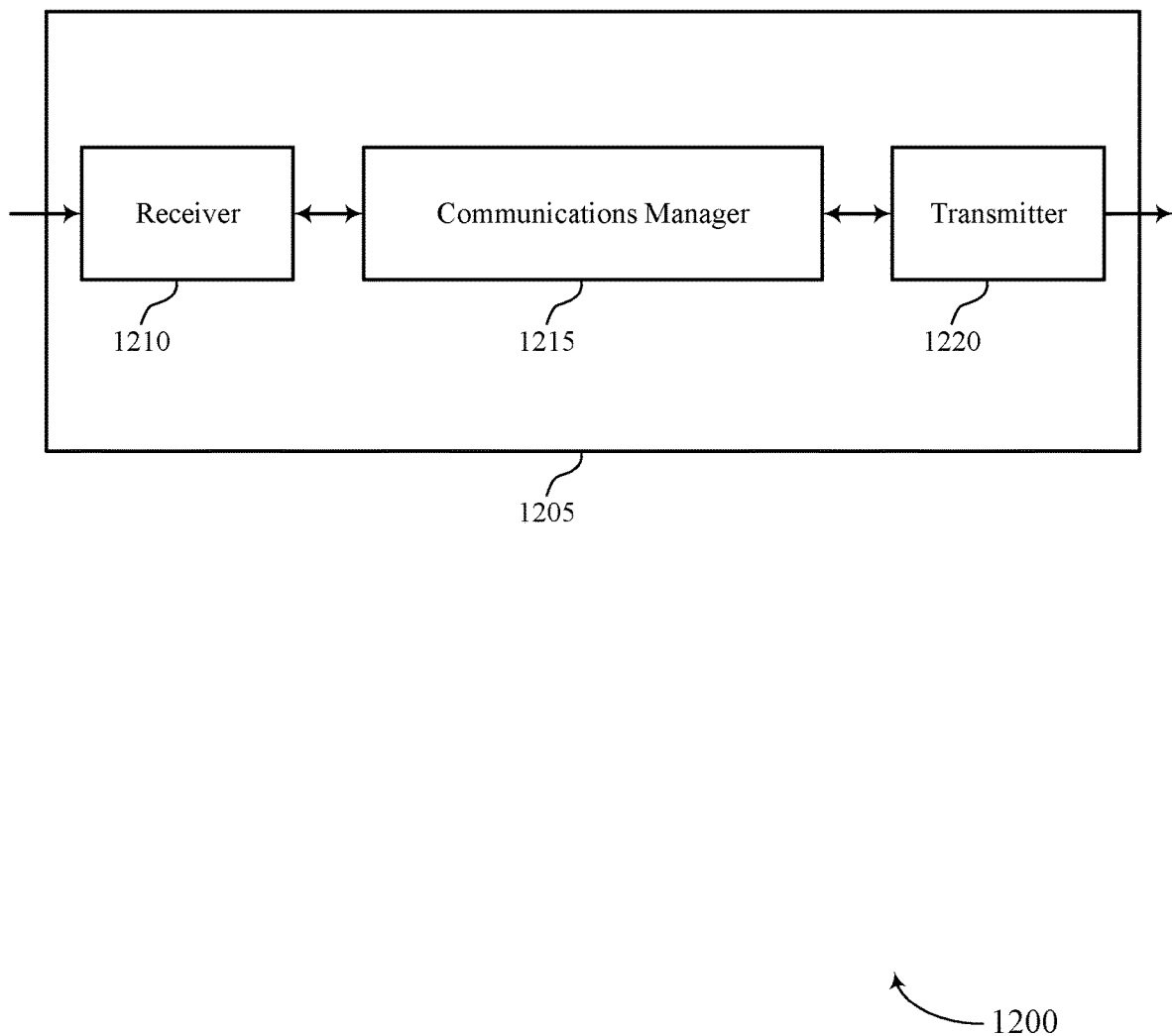
FIGS. 12 and 13 show block diagrams of devices that support TCI state-based CCE-to-REG bundle mapping in accordance with aspects of the present disclosure.

FIG. 12 shows a block diagram 1200 of a device 1205 that supports TCI state-based CCE-to-REG bundle mapping in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information channels related to TCI state-based CCE-to-REG bundle mapping, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may configure a CORESET with a first set of REG bundles associated with a first TCI state and a second set of REG bundles associated with a second TCI state, and may map each CCE of the CORESET to one or more first REG bundles of the first set of REG bundles, one or more second REG bundles of the second set of REG bundles, or both. The communications manager 1215 may also determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and transmit a DCI message in the PDCCH candidate associated with the CORESET based on the set of CCEs.

Additionally or alternatively, the communications manager 1215 may configure a CORESET with a first set of REG bundles associated with a first TCI state, a second set of REG bundles associated with a second TCI state, and a precoding granularity set to all contiguous resource blocks. The communications manager 1215 may also determine to use a first precoder across the first set of REG bundles associated with the first TCI state based on the precoding granularity being set to all contiguous resource blocks, determine to use a second precoder different from the first precoder across the second set of REG bundles associated with the second TCI state based on the precoding granularity being set to all contiguous resource blocks, and transmit a DCI message in a PDCCH candidate associated with the CORESET based on the first precoder, the second precoder, or both. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

By including or configuring the communications manager 1215 in accordance with examples as described herein, the device 1205 (e.g., a processor controlling or otherwise coupled with the receiver 1210, the transmitter 1220, the communications manager 1215, or a combination thereof) may support techniques for enhancing TCI state diversity, which may in turn improve reliability of control channels (e.g., a PDCCH). For example, the device 1205 may transmit a DCI message in a PDCCH candidate associated with multiple TCI states, and the increased TCI state diversity may improve the likelihood that a receiving device successfully decodes the DCI message. Such techniques may avoid retransmissions and increase communication efficiency, which may also reduce power consumption and increase battery life at the device 1205.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
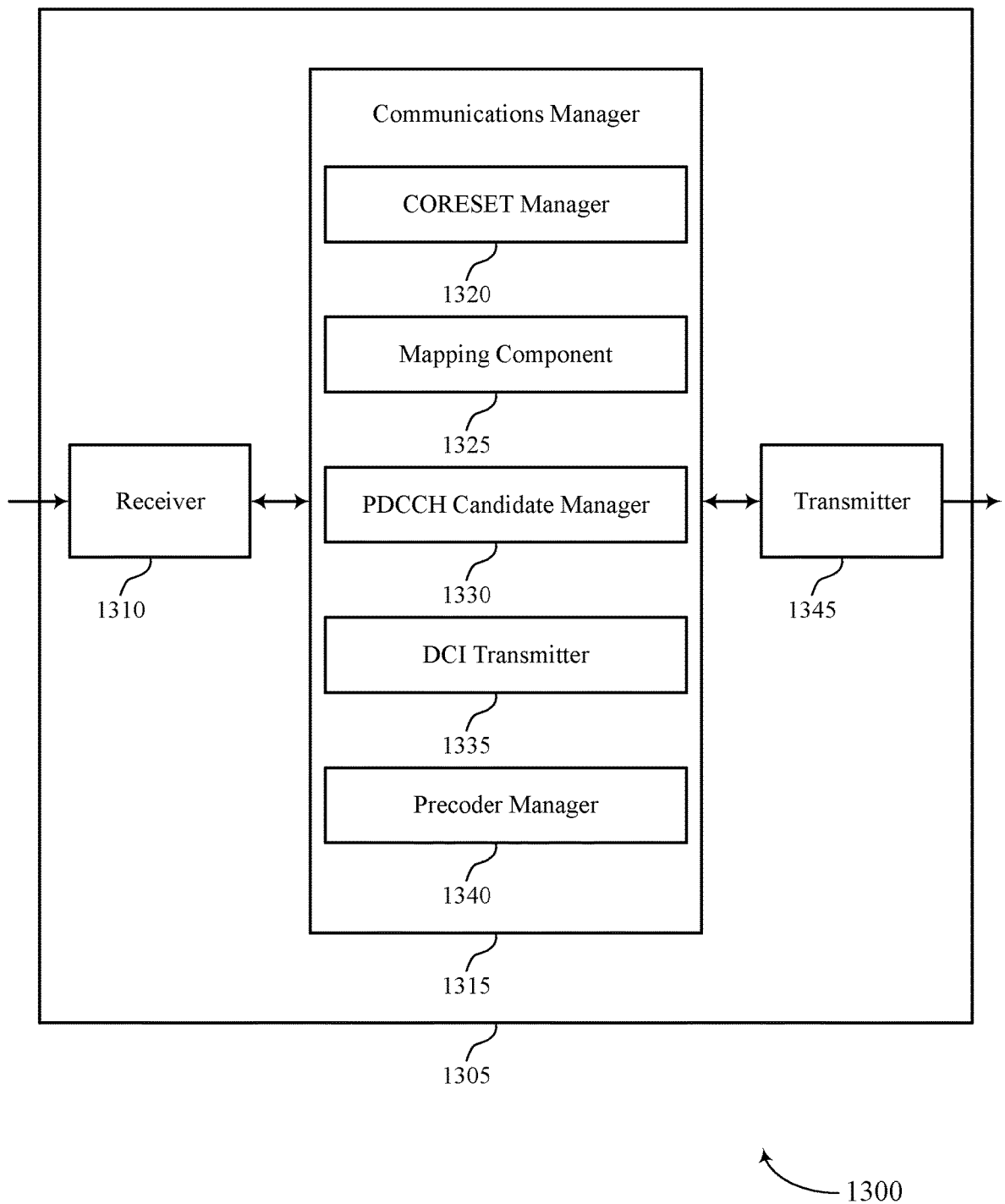

FIG. 13 shows a block diagram 1300 of a device 1305 that supports TCI state-based CCE-to-REG bundle mapping in accordance with aspects of the present disclosure. The device 1305 may be an example of aspects of a device 1205 or a base station 105 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information channels related to TCI state-based CCE-to-REG bundle mapping, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a CORESET manager 1320, a mapping component 1325, a PDCCH candidate manager 1330, a DCI transmitter 1335, a precoder manager 1340, or any combination thereof. The communications manager 1315 may be an example of aspects of the communications manager 1510 described herein.

The CORESET manager 1320 may configure a CORESET with a first set of REG bundles associated with a first TCI state and a second set of REG bundles associated with a second TCI state. The mapping component 1325 may map each CCE of the CORESET to one or more first REG bundles of the first set of REG bundles, one or more second REG bundles of the second set of REG bundles, or both. The PDCCH candidate manager 1330 may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state. The DCI transmitter 1335 may transmit a DCI message in the PDCCH candidate associated with the CORESET based on the set of CCEs.

The CORESET manager 1320 may configure a CORESET with a first set of REG bundles associated with a first TCI state, a second set of REG bundles associated with a second TCI state, and a precoding granularity set to all contiguous resource blocks. The precoder manager 1340 may determine to use a first precoder across the first set of REG bundles associated with the first TCI state based on the precoding granularity being set to all contiguous resource blocks and determine to use a second precoder different from the first precoder across the second set of REG bundles associated with the second TCI state based on the precoding granularity being set to all contiguous resource blocks. The DCI transmitter 1335 may transmit a DCI message in a PDCCH candidate associated with the CORESET based on the first precoder, the second precoder, or both.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
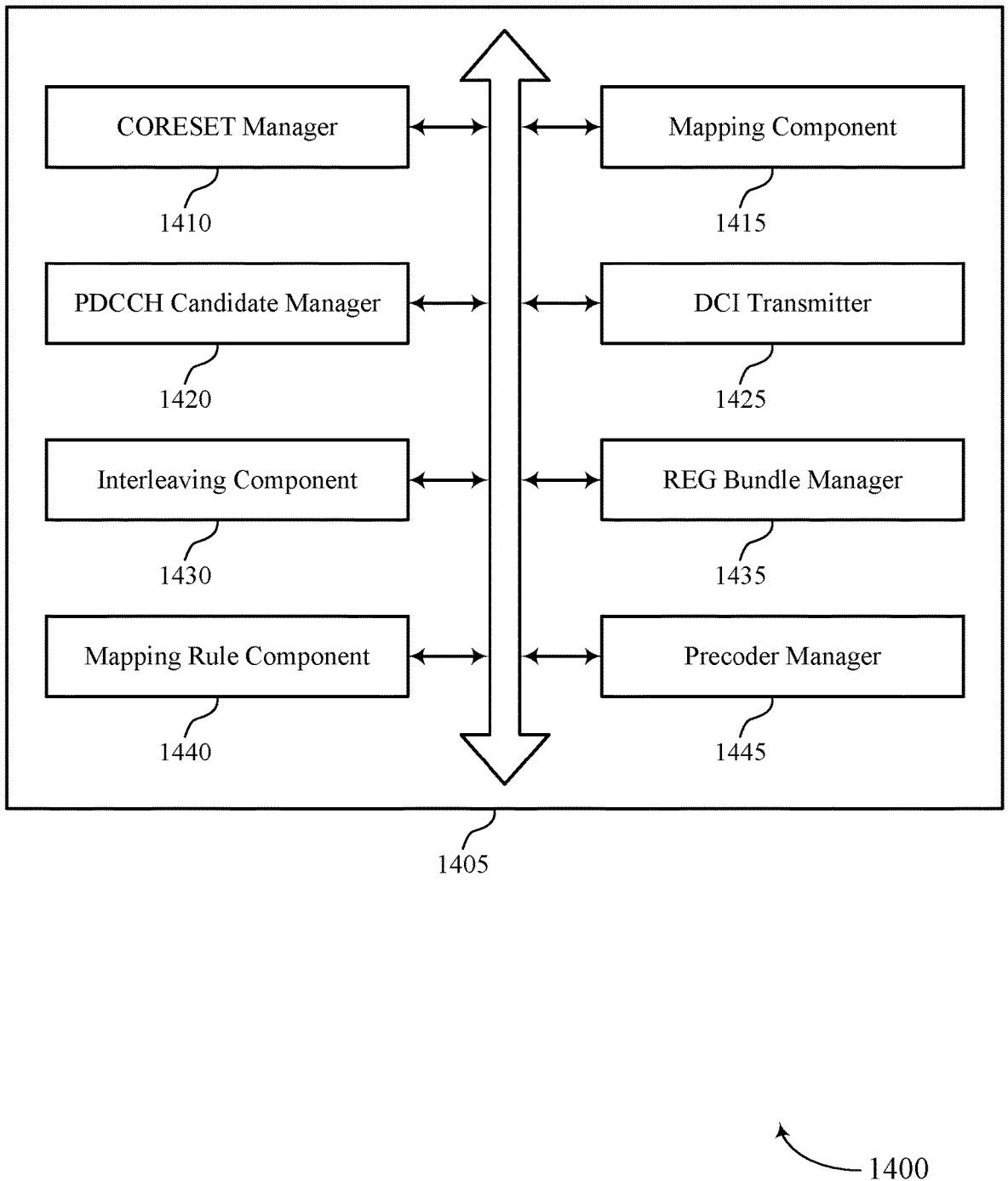
FIG. 14 shows a block diagram of a communications manager that supports TCI state-based CCE-to-REG bundle mapping in accordance with aspects of the present disclosure.

FIG. 14 shows a block diagram 1400 of a communications manager 1405 that supports TCI state-based CCE-to-REG bundle mapping in accordance with aspects of the present disclosure. The communications manager 1405 may be an example of aspects of a communications manager 1215, a communications manager 1315, or a communications manager 1510 described herein. The communications manager 1405 may include a CORESET manager 1410, a mapping component 1415, a PDCCH candidate manager 1420, a DCI transmitter 1425, an interleaving component 1430, a REG bundle manager 1435, a mapping rule component 1440, a precoder manager 1445, or any combination thereof. Each of these components may communicate, directly or indirectly, with one another (e.g., via one or more buses).

The CORESET manager 1410 may configure a CORESET with a first set of REG bundles associated with a first TCI state and a second set of REG bundles associated with a second TCI state. In some examples, the CORESET manager 1410 may transmit an RRC message including an indication of the configured CORESET.

The mapping component 1415 may map each CCE of the CORESET to one or more first REG bundles of the first set of REG bundles, one or more second REG bundles of the second set of REG bundles, or both. In some examples, the mapping component 1415 may map a first CCE of the CORESET to the one or more first REG bundles of the first set of REG bundles based on a first index of the first CCE. In some examples, the mapping component 1415 may map a second CCE of the CORESET to the one or more second REG bundles of the second set of REG bundles based on a second index of the second CCE, where the set of CCEs for the PDCCH candidate includes at least the first CCE and the second CCE. In some examples, the mapping component 1415 may map a first CCE of the CORESET to the one or more first REG bundles of the first set of REG bundles and the one or more second REG bundles of the second set of REG bundles, where the set of CCEs for the PDCCH candidate includes at least the first CCE.

The PDCCH candidate manager 1420 may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state.

The DCI transmitter 1425 may transmit a DCI message in the PDCCH candidate associated with the CORESET based on the set of CCEs. In some cases, the DCI message is transmitted according to the first TCI state and the second TCI state based on the set of CCEs for the PDCCH candidate including at least the first REG bundle associated with the first TCI state and at least the second REG bundle associated with the second TCI state.

In some examples, the CORESET manager 1410 may configure a CORESET with a first set of REG bundles associated with a first TCI state, a second set of REG bundles associated with a second TCI state, and a precoding granularity set to all contiguous resource blocks.

The precoder manager 1445 may determine to use a first precoder across the first set of REG bundles associated with the first TCI state based on the precoding granularity being set to all contiguous resource blocks. In some examples, the precoder manager 1445 may determine to use a second precoder different from the first precoder across the second set of REG bundles associated with the second TCI state based on the precoding granularity being set to all contiguous resource blocks.

In some examples, the DCI transmitter 1425 may transmit a DCI message in a PDCCH candidate associated with the CORESET based on the first precoder, the second precoder, or both.

The interleaving component 1430 may interleave the first set of REG bundles associated with the first TCI state according to an interleaver function. In some examples, the interleaving component 1430 may separately interleave the second set of REG bundles associated with the second TCI state according to the interleaver function, where the mapping is performed based on the interleaved first set of REG bundles and the separately interleaved second set of REG bundles.

In some examples, the interleaving component 1430 may refrain from interleaving the first set of REG bundles associated with the first TCI state based on applying an identity function to the first set of REG bundles. In some examples, the interleaving component 1430 may refrain from interleaving the second set of REG bundles associated with the second TCI state based on applying the identity function to the second set of REG bundles, where the mapping is performed based on refraining from interleaving the first set of REG bundles and refraining from interleaving the second set of REG bundles.

The REG bundle manager 1435 may generate a first set of indices for the first set of REG bundles associated with the first TCI state. In some examples, the REG bundle manager 1435 may separately generate a second set of indices for the second set of REG bundles associated with the second TCI state.

In some examples, the REG bundle manager 1435 may transmit an RRC message configuring the first set of REG bundles with the first TCI state and the second set of REG bundles with the second TCI state.

In some examples, the REG bundle manager 1435 may configure the first set of REG bundles to include up to four subsets of resource blocks that are non-contiguous in a frequency domain. In some examples, the REG bundle manager 1435 may configure the second set of REG bundles to include up to four additional subsets of resource blocks that are non-contiguous in the frequency domain.

The mapping rule component 1440 may transmit an RRC message indicating a CCE mapping rule, where the mapping is based on the CCE mapping rule.

Figure 15:
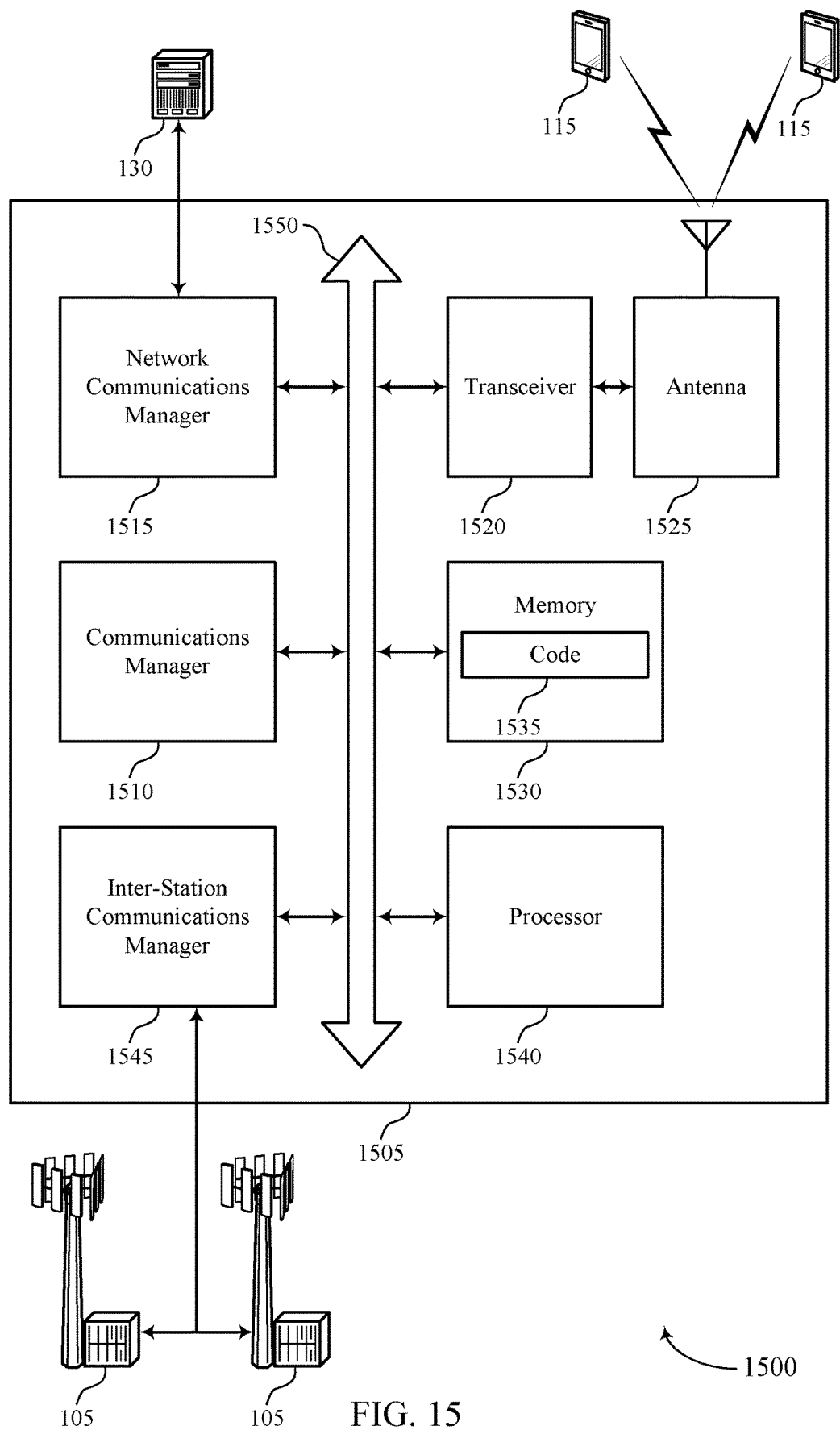
FIG. 15 shows a diagram of a system including a device that supports TCI state-based CCE-to-REG bundle mapping in accordance with aspects of the present disclosure.

FIG. 15 shows a diagram of a system 1500 including a device 1505 that supports TCI state-based CCE-to-REG bundle mapping in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may configure a CORESET with a first set of REG bundles associated with a first TCI state and a second set of REG bundles associated with a second TCI state, and may map each CCE of the CORESET to one or more first REG bundles of the first set of REG bundles, one or more second REG bundles of the second set of REG bundles, or both. The communications manager 1510 may also determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state, and transmit a DCI message in the PDCCH candidate associated with the CORESET based on the set of CCEs. Additionally or alternatively, the communications manager 1510 may configure a CORESET with a first set of REG bundles associated with a first TCI state, a second set of REG bundles associated with a second TCI state, and a precoding granularity set to all contiguous resource blocks. The communications manager 1510 may also determine to use a first precoder across the first set of REG bundles associated with the first TCI state based on the precoding granularity being set to all contiguous resource blocks, determine to use a second precoder different from the first precoder across the second set of REG bundles associated with the second TCI state based on the precoding granularity being set to all contiguous resource blocks, and transmit a DCI message in a PDCCH candidate associated with the CORESET based on the first precoder, the second precoder, or both.

In some examples, the communications manager 1510 may be configured to perform various operations (e.g., receiving, monitoring, transmitting) using or otherwise in cooperation with the transceiver 1520, the one or more antennas 1525, or any combination thereof. For example, the communications manager 1510 may be configured to monitor for, receive, or transmit messages or other signaling as described herein via the transceiver 1520.

The network communications manager 1515 may manage communications with the core network 130 (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting TCI state-based CCE-to-REG bundle mapping).

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

By including or configuring the communications manager 1510 in accordance with examples as described herein, the device 1505 may support techniques for enhancing TCI state diversity, which may in turn improve reliability of control channels (e.g., a PDCCH). For example, the device 1505 may support increased flexibility to transmit a DCI message in a PDCCH candidate associated with multiple TCI states, which may increase the likelihood that the DCI message is received at a receiving device. Additionally, the device 1505 may transmit CCEs including REG bundles that are separated in the frequency domain, which may increase channel bandwidth and further increase communication efficiency and reliability in the wireless communications system.

Figure 16:
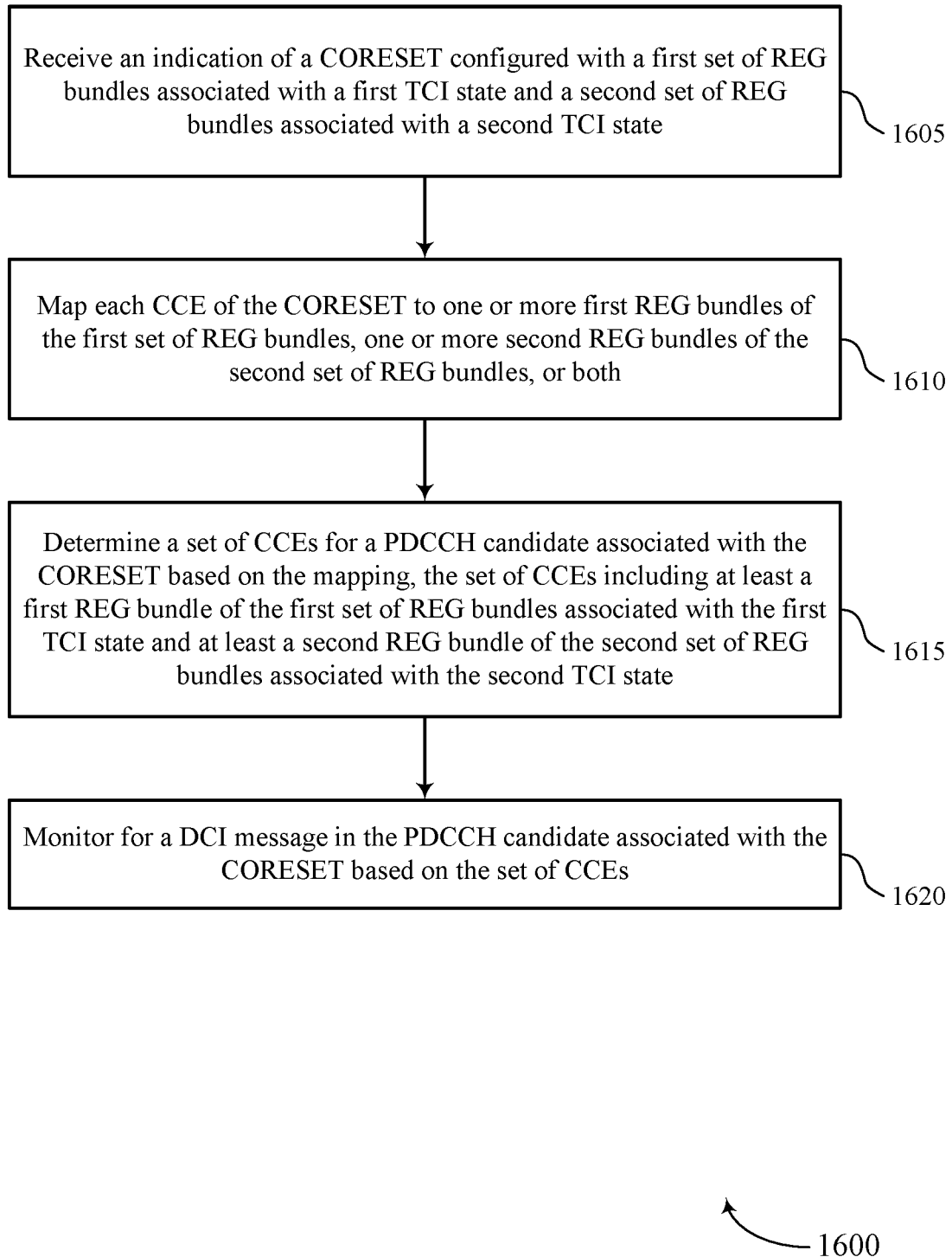
FIGS. 16 through 21 show flowcharts illustrating methods that support TCI state-based CCE-to-REG bundle mapping in accordance with aspects of the present disclosure.

FIG. 16 shows a flowchart illustrating a method 1600 that supports TCI state-based CCE-to-REG bundle mapping in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive an indication of a CORESET configured with a first set of REG bundles associated with a first TCI state and a second set of REG bundles associated with a second TCI state. The operations of 1605 may be performed according to the methods described herein. In some examples, aspects of the operations of 1605 may be performed by a CORESET manager as described with reference to FIGS. 8 through 11. Additionally or alternatively, means for performing 1605 may include, for example, an antenna 1125, a transceiver 1120, a communications manager 1110, memory 1130 (e.g., including code 1135), a processor 1140, an I/O controller 1115, a bus 1145, or any combination thereof.

At 1610, the UE may map each CCE of the CORESET to one or more first REG bundles of the first set of REG bundles, one or more second REG bundles of the second set of REG bundles, or both. The operations of 1610 may be performed according to the methods described herein. In some examples, aspects of the operations of 1610 may be performed by a mapping component as described with reference to FIGS. 8 through 11. Additionally or alternatively, means for performing 1610 may include, for example, an antenna 1125, a transceiver 1120, a communications manager 1110, memory 1130 (e.g., including code 1135), a processor 1140, an I/O controller 1115, a bus 1145, or any combination thereof.

At 1615, the UE may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state. The operations of 1615 may be performed according to the methods described herein. In some examples, aspects of the operations of 1615 may be performed by a PDCCH candidate manager as described with reference to FIGS. 8 through 11. Additionally or alternatively, means for performing 1615 may include, for example, an antenna 1125, a transceiver 1120, a communications manager 1110, memory 1130 (e.g., including code 1135), a processor 1140, an I/O controller 1115, a bus 1145, or any combination thereof.

At 1620, the UE may monitor for a DCI message in the PDCCH candidate associated with the CORESET based on the set of CCEs. The operations of 1620 may be performed according to the methods described herein. In some examples, aspects of the operations of 1620 may be performed by a DCI monitoring component as described with reference to FIGS. 8 through 11. Additionally or alternatively, means for performing 1620 may include, for example, an antenna 1125, a transceiver 1120, a communications manager 1110, memory 1130 (e.g., including code 1135), a processor 1140, an I/O controller 1115, a bus 1145, or any combination thereof.

Figure 17:
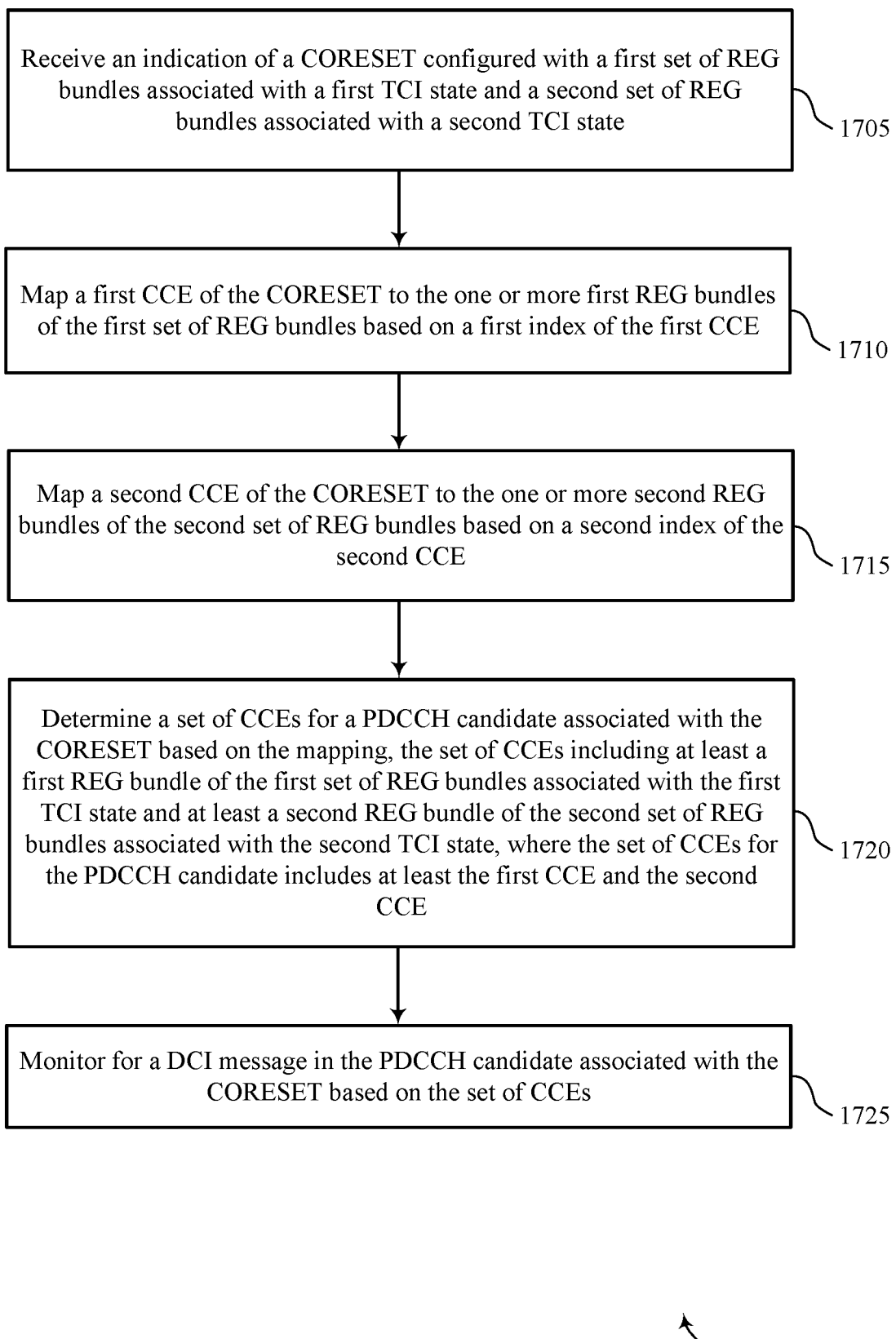

FIG. 17 shows a flowchart illustrating a method 1700 that supports TCI state-based CCE-to-REG bundle mapping in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive an indication of a CORESET configured with a first set of REG bundles associated with a first TCI state and a second set of REG bundles associated with a second TCI state. The operations of 1705 may be performed according to the methods described herein. In some examples, aspects of the operations of 1705 may be performed by a CORESET manager as described with reference to FIGS. 8 through 11. Additionally or alternatively, means for performing 1705 may include, for example, an antenna 1125, a transceiver 1120, a communications manager 1110, memory 1130 (e.g., including code 1135), a processor 1140, an I/O controller 1115, a bus 1145, or any combination thereof.

At 1710, the UE may map a first CCE of the CORESET to the one or more first REG bundles of the first set of REG bundles based on a first index of the first CCE. The operations of 1710 may be performed according to the methods described herein. In some examples, aspects of the operations of 1710 may be performed by a mapping component as described with reference to FIGS. 8 through 11. Additionally or alternatively, means for performing 1710 may include, for example, an antenna 1125, a transceiver 1120, a communications manager 1110, memory 1130 (e.g., including code 1135), a processor 1140, an I/O controller 1115, a bus 1145, or any combination thereof.

At 1715, the UE may map a second CCE of the CORESET to the one or more second REG bundles of the second set of REG bundles based on a second index of the second CCE. The operations of 1715 may be performed according to the methods described herein. In some examples, aspects of the operations of 1715 may be performed by a mapping component as described with reference to FIGS. 8 through 11. Additionally or alternatively, means for performing 1715 may include, for example, an antenna 1125, a transceiver 1120, a communications manager 1110, memory 1130 (e.g., including code 1135), a processor 1140, an I/O controller 1115, a bus 1145, or any combination thereof.

At 1720, the UE may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state. For example, the set of CCEs for the PDCCH candidate includes at least the first CCE and the second CCE. The operations of 1720 may be performed according to the methods described herein. In some examples, aspects of the operations of 1720 may be performed by a PDCCH candidate manager as described with reference to FIGS. 8 through 11. Additionally or alternatively, means for performing 1720 may include, for example, an antenna 1125, a transceiver 1120, a communications manager 1110, memory 1130 (e.g., including code 1135), a processor 1140, an I/O controller 1115, a bus 1145, or any combination thereof.

At 1725, the UE may monitor for a DCI message in the PDCCH candidate associated with the CORESET based on the set of CCEs. The operations of 1725 may be performed according to the methods described herein. In some examples, aspects of the operations of 1725 may be performed by a DCI monitoring component as described with reference to FIGS. 8 through 11. Additionally or alternatively, means for performing 1725 may include, for example, an antenna 1125, a transceiver 1120, a communications manager 1110, memory 1130 (e.g., including code 1135), a processor 1140, an I/O controller 1115, a bus 1145, or any combination thereof.

Figure 18:
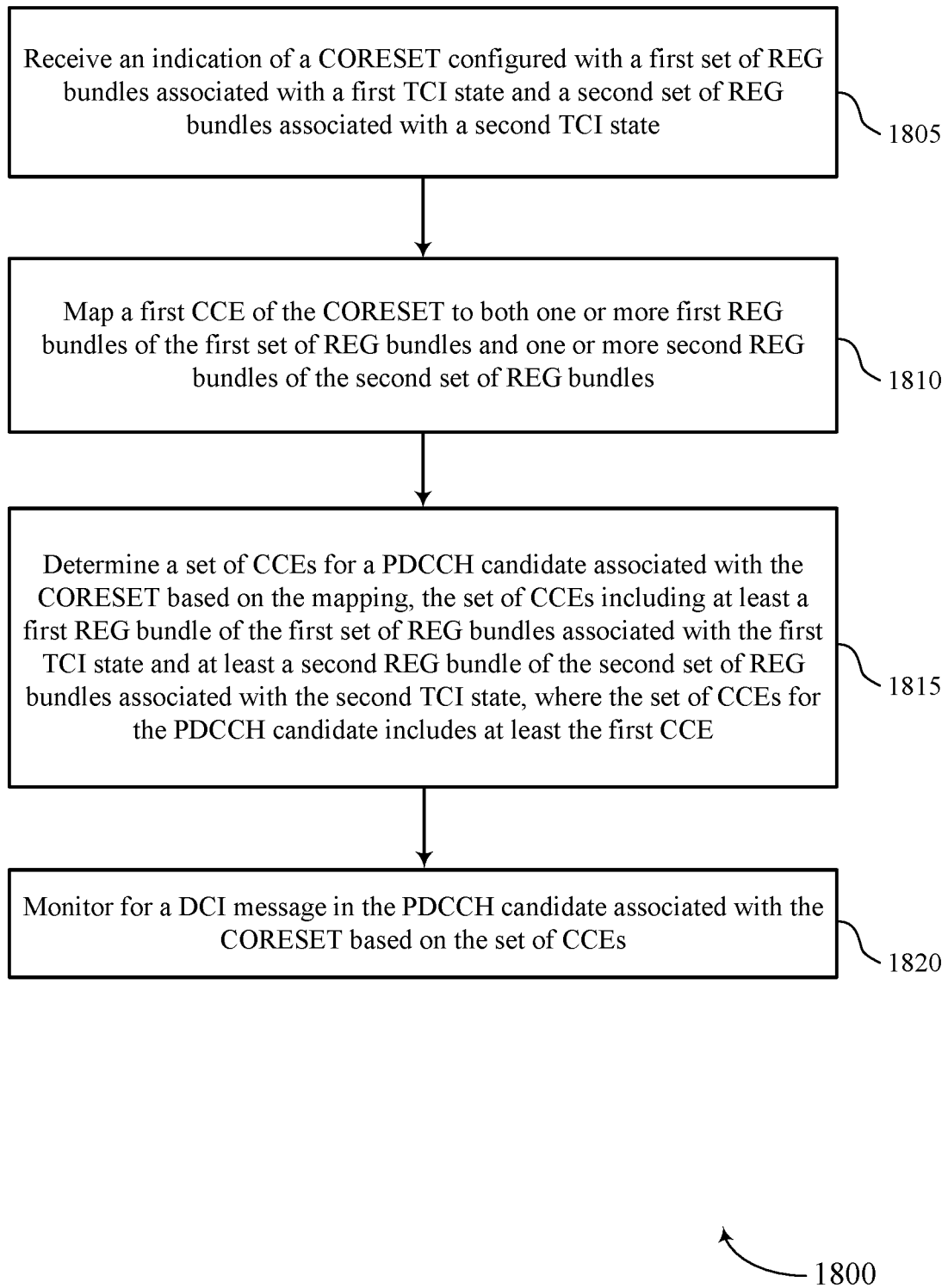

FIG. 18 shows a flowchart illustrating a method 1800 that supports TCI state-based CCE-to-REG bundle mapping in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive an indication of a CORESET configured with a first set of REG bundles associated with a first TCI state and a second set of REG bundles associated with a second TCI state. The operations of 1805 may be performed according to the methods described herein. In some examples, aspects of the operations of 1805 may be performed by a CORESET manager as described with reference to FIGS. 8 through 11. Additionally or alternatively, means for performing 1805 may include, for example, an antenna 1125, a transceiver 1120, a communications manager 1110, memory 1130 (e.g., including code 1135), a processor 1140, an I/O controller 1115, a bus 1145, or any combination thereof.

At 1810, the UE may map a first CCE of the CORESET to the one or more first REG bundles of the first set of REG bundles and the one or more second REG bundles of the second set of REG bundles. The operations of 1810 may be performed according to the methods described herein. In some examples, aspects of the operations of 1810 may be performed by a mapping component as described with reference to FIGS. 8 through 11. Additionally or alternatively, means for performing 1810 may include, for example, an antenna 1125, a transceiver 1120, a communications manager 1110, memory 1130 (e.g., including code 1135), a processor 1140, an I/O controller 1115, a bus 1145, or any combination thereof.

At 1815, the UE may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state. For example, the set of CCEs for the PDCCH candidate may include at least the first CCE. The operations of 1815 may be performed according to the methods described herein. In some examples, aspects of the operations of 1815 may be performed by a PDCCH candidate manager as described with reference to FIGS. 8 through 11. Additionally or alternatively, means for performing 1815 may include, for example, an antenna 1125, a transceiver 1120, a communi-cations manager 1110, memory 1130 (e.g., including code 1135), a processor 1140, an I/O controller 1115, a bus 1145, or any combination thereof.

At 1820, the UE may monitor for a DCI message in the PDCCH candidate associated with the CORESET based on the set of CCEs. The operations of 1820 may be performed according to the methods described herein. In some examples, aspects of the operations of 1820 may be performed by a DCI monitoring component as described with reference to FIGS. 8 through 11. Additionally or alternatively, means for performing 1820 may include, for example, an antenna 1125, a transceiver 1120, a communications manager 1110, memory 1130 (e.g., including code 1135), a processor 1140, an I/O controller 1115, a bus 1145, or any combination thereof.

Figure 19:
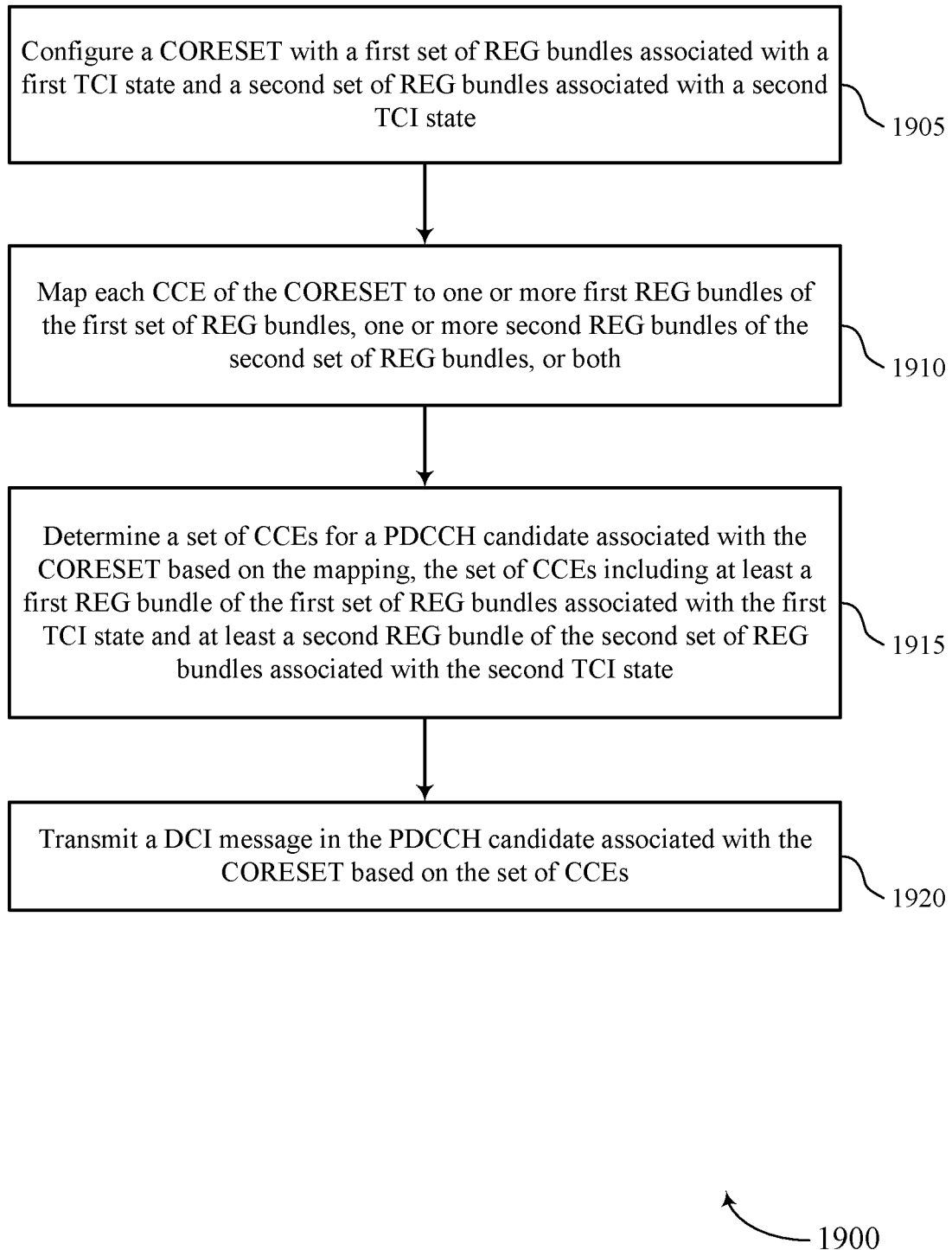

FIG. 19 shows a flowchart illustrating a method 1900 that supports TCI state-based CCE-to-REG bundle mapping in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may configure a CORESET with a first set of REG bundles associated with a first TCI state and a second set of REG bundles associated with a second TCI state. The operations of 1905 may be performed according to the methods described herein. In some examples, aspects of the operations of 1905 may be performed by a CORESET manager as described with reference to FIGS. 12 through 15. Additionally or alternatively, means for performing 1905 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

At 1910, the base station may map each CCE of the CORESET to one or more first REG bundles of the first set of REG bundles, one or more second REG bundles of the second set of REG bundles, or both. The operations of 1910 may be performed according to the methods described herein. In some examples, aspects of the operations of 1910 may be performed by a mapping component as described with reference to FIGS. 12 through 15. Additionally or alternatively, means for performing 1910 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

At 1915, the base station may determine a set of CCEs for a PDCCH candidate associated with the CORESET based on the mapping, the set of CCEs including at least a first REG bundle of the first set of REG bundles associated with the first TCI state and at least a second REG bundle of the second set of REG bundles associated with the second TCI state. The operations of 1915 may be performed according to the methods described herein. In some examples, aspects of the operations of 1915 may be performed by a PDCCH candidate manager as described with reference to FIGS. 12 through 15. Additionally or alternatively, means for performing 1915 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

At 1920, the base station may transmit a DCI message in the PDCCH candidate associated with the CORESET based on the set of CCEs. The operations of 1920 may be performed according to the methods described herein. In some examples, aspects of the operations of 1920 may be performed by a DCI transmitter as described with reference to FIGS. 12 through 15. Additionally or alternatively, means for performing 1920 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

Figure 20:
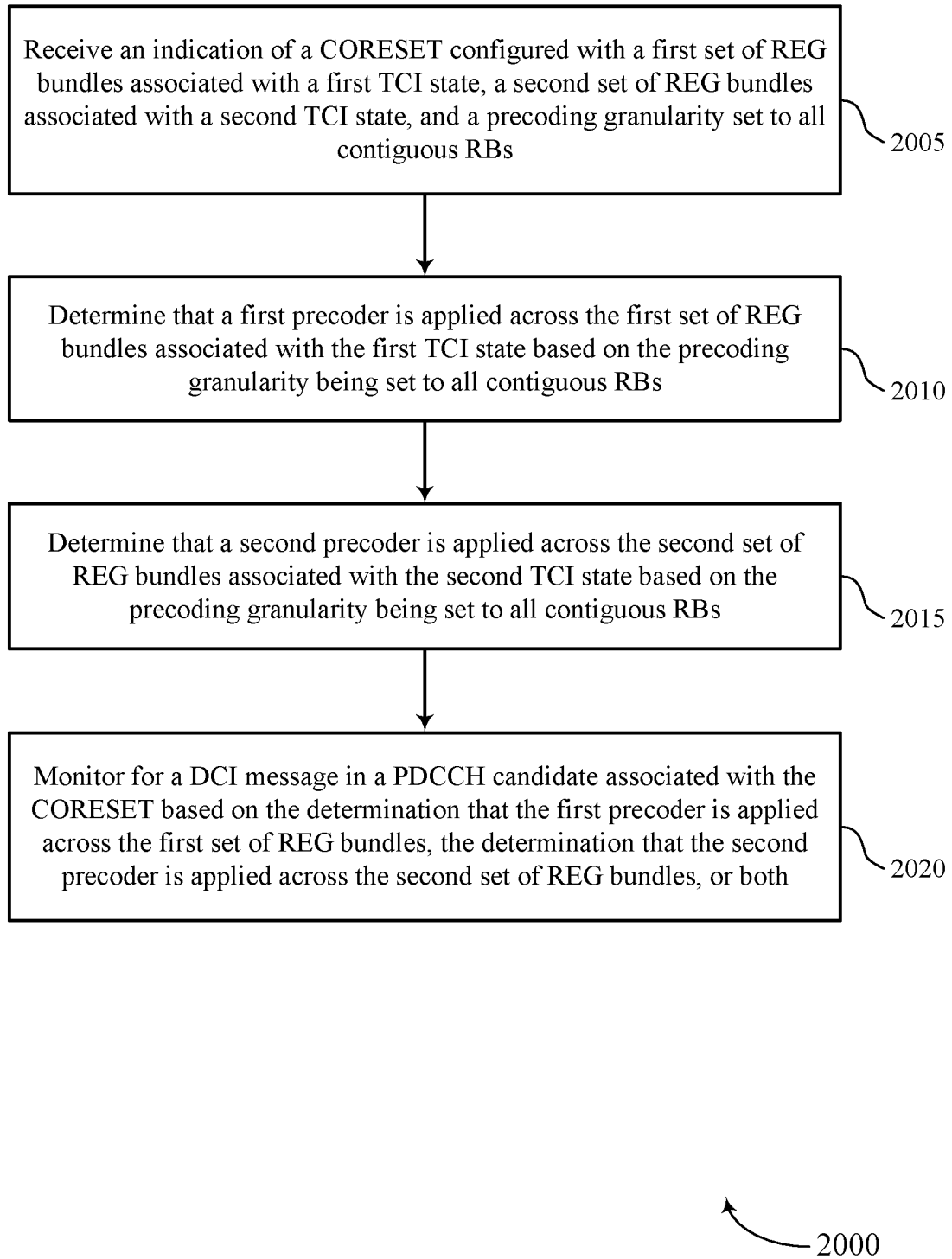

FIG. 20 shows a flowchart illustrating a method 2000 that supports TCI state-based CCE-to-REG bundle mapping in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive an indication of a CORESET configured with a first set of REG bundles associated with a first TCI state, a second set of REG bundles associated with a second TCI state, and a precoding granularity set to all contiguous resource blocks. The operations of 2005 may be performed according to the methods described herein. In some examples, aspects of the operations of 2005 may be performed by a CORESET manager as described with reference to FIGS. 8 through 11. Additionally or alternatively, means for performing 2005 may include, for example, an antenna 1125, a transceiver 1120, a communications manager 1110, memory 1130 (e.g., including code 1135), a processor 1140, an I/O controller 1115, a bus 1145, or any combination thereof.

At 2010, the UE may determine that a first precoder is applied across the first set of REG bundles associated with the first TCI state based on the precoding granularity being set to all contiguous resource blocks. The operations of 2010 may be performed according to the methods described herein. In some examples, aspects of the operations of 2010 may be performed by a precoder manager as described with reference to FIGS. 8 through 11. Additionally or alternatively, means for performing 2010 may include, for example, an antenna 1125, a transceiver 1120, a communications manager 1110, memory 1130 (e.g., including code 1135), a processor 1140, an I/O controller 1115, a bus 1145, or any combination thereof.

At 2015, the UE may determine that a second precoder is applied across the second set of REG bundles associated with the second TCI state based on the precoding granularity being set to all contiguous resource blocks. The operations of 2015 may be performed according to the methods described herein. In some examples, aspects of the operations of 2015 may be performed by a precoder manager as described with reference to FIGS. 8 through 11. Additionally or alternatively, means for performing 2015 may include, for example, an antenna 1125, a transceiver 1120, a communications manager 1110, memory 1130 (e.g., including code 1135), a processor 1140, an I/O controller 1115, a bus 1145, or any combination thereof.

At 2020, the UE may monitor for a DCI message in a PDCCH candidate associated with the CORESET based on the determination that the first precoder is applied across the first set of REG bundles, the determination that the second precoder is applied across the second set of REG bundles, or both. The operations of 2020 may be performed according to the methods described herein. In some examples, aspects of the operations of 2020 may be performed by a DCI monitoring component as described with reference to FIGS. 8 through 11. Additionally or alternatively, means for performing 2020 may include, for example, an antenna 1125, a transceiver 1120, a communications manager 1110, memory 1130 (e.g., including code 1135), a processor 1140, an I/O controller 1115, a bus 1145, or any combination thereof.

Figure 21:
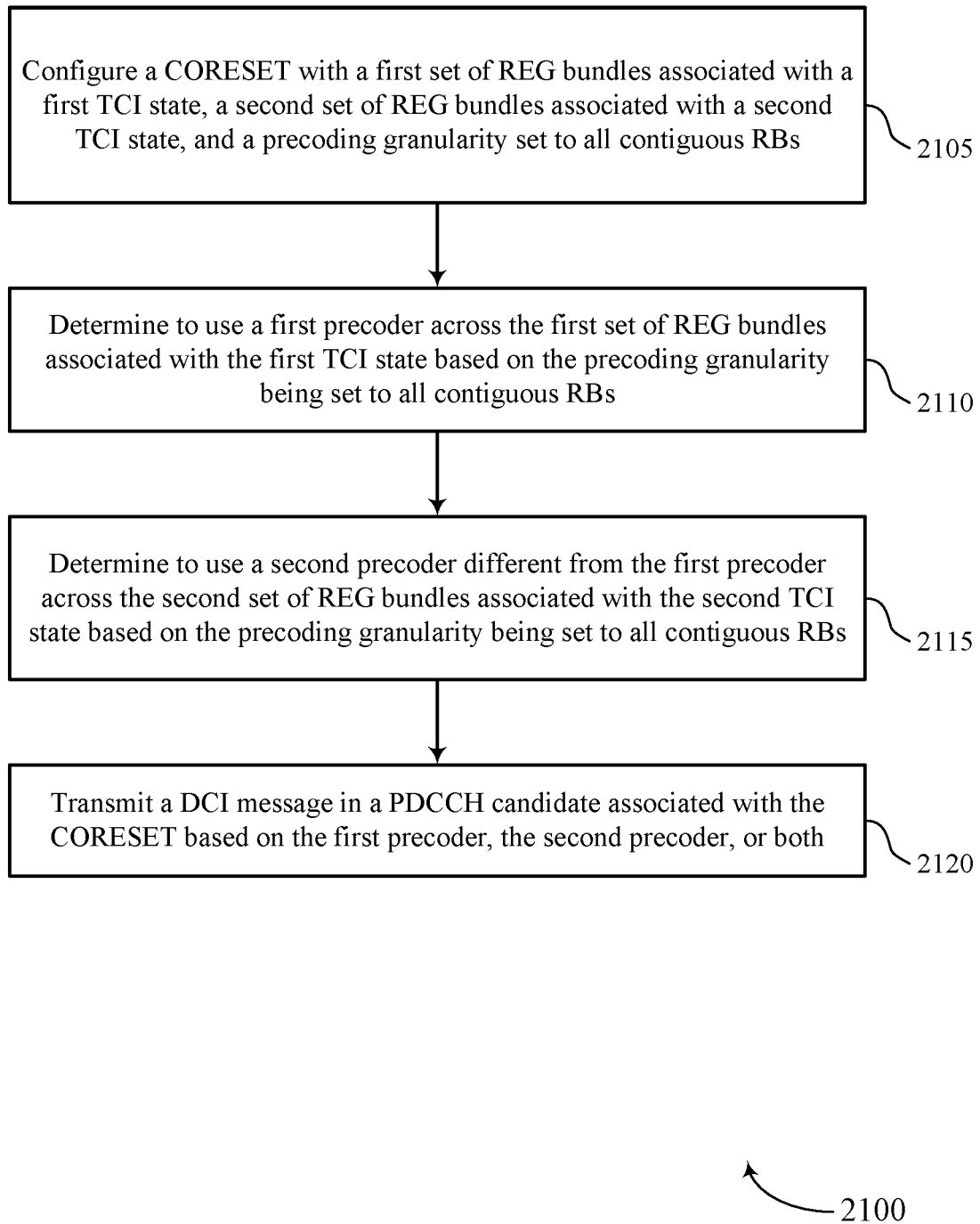

FIG. 21 shows a flowchart illustrating a method 2100 that supports TCI state-based CCE-to-REG bundle mapping in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may configure a CORESET with a first set of REG bundles associated with a first TCI state, a second set of REG bundles associated with a second TCI state, and a precoding granularity set to all contiguous resource blocks. The operations of 2105 may be performed according to the methods described herein. In some examples, aspects of the operations of 2105 may be performed by a CORESET manager as described with reference to FIGS. 12 through 15. Additionally or alternatively, means for performing 2105 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

At 2110, the base station may determine to use a first precoder across the first set of REG bundles associated with the first TCI state based on the precoding granularity being set to all contiguous resource blocks. The operations of 2110 may be performed according to the methods described herein. In some examples, aspects of the operations of 2110 may be performed by a precoder manager as described with reference to FIGS. 12 through 15. Additionally or alternatively, means for performing 2110 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

At 2115, the base station may determine to use a second precoder different from the first precoder across the second set of REG bundles associated with the second TCI state based on the precoding granularity being set to all contiguous resource blocks. The operations of 2115 may be performed according to the methods described herein. In some examples, aspects of the operations of 2115 may be performed by a precoder manager as described with reference to FIGS. 12 through 15. Additionally or alternatively, means for performing 2115 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

At 2120, the base station may transmit a DCI message in a PDCCH candidate associated with the CORESET based on the first precoder, the second precoder, or both. The operations of 2120 may be performed according to the methods described herein. In some examples, aspects of the operations of 2120 may be performed by a DCI transmitter as described with reference to FIGS. 12 through 15. Additionally or alternatively, means for performing 2120 may include, for example, an antenna 1525, a transceiver 1520, a communications manager 1510, memory 1530 (e.g., including code 1535), a processor 1540, a network communications manager 1515, an inter-station communications manager 1545, a bus 1550, or any combination thereof.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving an indication of a CORESET configured with a first set of REG bundles associated with a first TCI state and a second set of REG bundles associated with a second TCI state; mapping each CCE of the CORESET to one or more first REG bundles of the first set of REG bundles, one or more second REG bundles of the second set of REG bundles, or both; determining a set of CCEs for a PDCCH candidate associated with the CORESET based at least in part on the mapping, the set of CCEs comprising at least a first REG bundle of the first set of REG bundles associated with the first TCI state and at least a second REG bundle of the second set of REG bundles associated with the second TCI state; and monitoring for a DCI message in the PDCCH candidate associated with the CORESET based at least in part on the set of CCEs.

Aspect 2: The method of aspect 1, further comprising: interleaving the first set of REG bundles associated with the first TCI state according to an interleaver function; and separately interleaving the second set of REG bundles associated with the second TCI state according to the interleaver function, wherein the mapping is performed based at least in part on the interleaved first set of REG bundles and the separately interleaved second set of REG bundles.

Aspect 3: The method of aspect 1, further comprising: refraining from interleaving the first set of REG bundles associated with the first TCI state based at least in part on applying an identity function to the first set of REG bundles; and refraining from interleaving the second set of REG bundles associated with the second TCI state based at least in part on applying the identity function to the second set of REG bundles, wherein the mapping is performed based at least in part on refraining from interleaving the first set of REG bundles and refraining from interleaving the second set of REG bundles.

Aspect 4: The method of any of aspects 1 through 3, further comprising: generating a first set of indices for the first set of REG bundles associated with the first TCI state; and separately generating a second set of indices for the second set of REG bundles associated with the second TCI state.

Aspect 5: The method of any of aspects 1 through 4, wherein the mapping comprises: mapping a first CCE of the CORESET to the one or more first REG bundles of the first set of REG bundles based at least in part on a first index of the first CCE; and mapping a second CCE of the CORESET to the one or more second REG bundles of the second set of REG bundles based at least in part on a second index of the second CCE, wherein the set of CCEs for the PDCCH candidate comprises at least the first CCE and the second CCE.

Aspect 6: The method of aspect 5, wherein the first CCE is mapped to the one or more first REG bundles of the first set of REG bundles based at least in part on the first index being even; and the second CCE is mapped to the one or more second REG bundles of the second set of REG bundles based at least in part on the second index being odd.

Aspect 7: The method of any of aspects 1 through 4, wherein the mapping comprises: mapping a first CCE of the CORESET to the one or more first REG bundles of the first set of REG bundles and the one or more second REG bundles of the second set of REG bundles, wherein the set of CCEs for the PDCCH candidate comprises at least the first CCE.

Aspect 8: The method of aspect 7, wherein the mapping the first CCE comprises: alternating mapping the first CCE to a respective REG bundle of the first set of REG bundles and to a respective REG bundle of the second set of REG bundles.

Aspect 9: The method of any of aspects 1 through 8, further comprising: receiving an RRC message indicating a CCE mapping rule, wherein the mapping is based at least in part on the CCE mapping rule.

Aspect 10: The method of any of aspects 1 through 8, further comprising: storing, in memory, a CCE mapping rule, wherein the mapping is based at least in part on the CCE mapping rule.

Aspect 11: The method of any of aspects 1 through 10, further comprising: receiving an RRC message configuring the first set of REG bundles with the first TCI state and the second set of REG bundles with the second TCI state.

Aspect 12: The method of any of aspects 1 through 10, further comprising: storing, in memory, a TCI state mapping rule configuring the first set of REG bundles with the first TCI state and the second set of REG bundles with the second TCI state.

Aspect 13: The method of any of aspects 1 through 12, further comprising: receiving, based at least in part on the monitoring, the DCI message in the PDCCH candidate according to the first TCI state and the second TCI state based at least in part on the set of CCEs for the PDCCH candidate comprising at least the first REG bundle associated with the first TCI state and at least the second REG bundle associated with the second TCI state.

Aspect 14: The method of any of aspects 1 through 13, wherein the PDCCH candidate corresponds to an aggregation level; and the set of CCEs for the PDCCH candidate comprises a number of CCEs equal to the aggregation level.

Aspect 15: The method of any of aspects 1 through 14, wherein each REG bundle of the first set of REG bundles and the second set of REG bundles comprises a number of REGs based at least in part on a REG bundle size.

Aspect 16: The method of aspect 15, further comprising: receiving an RRC message indicating the REG bundle size, wherein the REG bundle size is based at least in part on a number of symbols of the CORESET.

Aspect 17: The method of any of aspects 15 through 16, wherein the number of REGs in each REG bundle comprises one REG, two REGs, three REGs, or six REGs.

Aspect 18: A method for wireless communications at a base station, comprising: configuring a CORESET with a first set of REG bundles associated with a first TCI state and a second set of REG bundles associated with a second TCI state; mapping each CCE of the CORESET to one or more first REG bundles of the first set of REG bundles, one or more second REG bundles of the second set of REG bundles, or both; determining a set of CCEs for a PDCCH candidate associated with the CORESET based at least in part on the mapping, the set of CCEs comprising at least a first REG bundle of the first set of REG bundles associated with the first TCI state and at least a second REG bundle of the second set of REG bundles associated with the second TCI state; and transmitting a DCI message in the PDCCH candidate associated with the CORESET based at least in part on the set of CCEs.

Aspect 19: The method of aspect 18, further comprising: interleaving the first set of REG bundles associated with the first TCI state according to an interleaver function; and separately interleaving the second set of REG bundles associated with the second TCI state according to the interleaver function, wherein the mapping is performed based at least in part on the interleaved first set of REG bundles and the separately interleaved second set of REG bundles.

Aspect 20: The method of aspect 18, further comprising: refraining from interleaving the first set of REG bundles associated with the first TCI state based at least in part on applying an identity function to the first set of REG bundles; and refraining from interleaving the second set of REG bundles associated with the second TCI state based at least in part on applying the identity function to the second set of REG bundles, wherein the mapping is performed based at least in part on refraining from interleaving the first set of REG bundles and refraining from interleaving the second set of REG bundles.

Aspect 21: The method of any of aspects 18 through 20, further comprising: generating a first set of indices for the first set of REG bundles associated with the first TCI state; and separately generating a second set of indices for the second set of REG bundles associated with the second TCI state.

Aspect 22: The method of any of aspects 18 through 21, wherein the mapping comprises: mapping a first CCE of the CORESET to the one or more first REG bundles of the first set of REG bundles based at least in part on a first index of the first CCE; and mapping a second CCE of the CORESET to the one or more second REG bundles of the second set of REG bundles based at least in part on a second index of the second CCE, wherein the set of CCEs for the PDCCH candidate comprises at least the first CCE and the second CCE.

Aspect 23: The method of any of aspects 18 through 21, wherein the mapping comprises: mapping a first CCE of the CORESET to the one or more first REG bundles of the first set of REG bundles and the one or more second REG bundles of the second set of REG bundles, wherein the set of CCEs for the PDCCH candidate comprises at least the first CCE.

Aspect 24: The method of any of aspects 18 through 23, further comprising: transmitting an RRC message indicating a CCE mapping rule, wherein the mapping is based at least in part on the CCE mapping rule.

Aspect 25: The method of any of aspects 18 through 24, further comprising: transmitting an RRC message configuring the first set of REG bundles with the first TCI state and the second set of REG bundles with the second TCI state.

Aspect 26: The method of any of aspects 18 through 25, wherein the DCI message is transmitted according to the first TCI state and the second TCI state based at least in part on the set of CCEs for the PDCCH candidate comprising at least the first REG bundle associated with the first TCI state and at least the second REG bundle associated with the second TCI state.

Aspect 27: A method for wireless communications at a UE, comprising: receiving an indication of a CORESET configured with a first set of REG bundles associated with a first TCI state, a second set of REG bundles associated with a second TCI state, and a precoding granularity set to all contiguous resource blocks; determining that a first precoder is applied across the first set of REG bundles associated with the first TCI state based at least in part on the precoding granularity being set to all contiguous resource blocks; determining that a second precoder is applied across the second set of REG bundles associated with the second TCI state based at least in part on the precoding granularity being set to all contiguous resource blocks; and monitoring for a DCI message in a PDCCH candidate associated with the CORESET based at least in part on the determination that the first precoder is applied across the first set of REG bundles, the determination that the second precoder is applied across the second set of REG bundles, or both.

Aspect 28: The method of aspect 27, wherein the first set of REG bundles is configured to comprise up to four subsets of resource blocks of the CORESET that are non-contiguous in a frequency domain; and the second set of REG bundles is configured to comprise up to four additional subsets of resource blocks of the CORESET that are non-contiguous in the frequency domain.

Aspect 29: The method of any of aspects 27 through 28, wherein receiving the indication of the CORESET comprises: receiving an RRC message comprising the indication of the CORESET.

Aspect 30: The method of any of aspects 27 through 29, further comprising: performing a first joint channel estimation across the first set of REG bundles associated with the first TCI state based at least in part on the determination that the first precoder is applied across the first set of REG bundles; and performing a second joint channel estimation across the second set of REG bundles associated with the second TCI state based at least in part on the determination that the second precoder is applied across the second set of REG bundles.

Aspect 31: A method for wireless communications at a base station, comprising: configuring a CORESET with a first set of REG bundles associated with a first TCI state, a second set of REG bundles associated with a second TCI state, and a precoding granularity set to all contiguous resource blocks; determining to use a first precoder across the first set of REG bundles associated with the first TCI state based at least in part on the precoding granularity being set to all contiguous resource blocks; determining to use a second precoder different from the first precoder across the second set of REG bundles associated with the second TCI state based at least in part on the precoding granularity being set to all contiguous resource blocks; and transmitting a DCI message in a PDCCH candidate associated with the CORESET based at least in part on the first precoder, the second precoder, or both.

Aspect 32: The method of aspect 31, wherein configuring the CORESET further comprises: configuring the first set of REG bundles to comprise up to four subsets of resource blocks that are non-contiguous in a frequency domain; and configuring the second set of REG bundles to comprise up to four additional subsets of resource blocks that are non-contiguous in the frequency domain.

Aspect 33: The method of any of aspects 31 through 32, further comprising: transmitting an RRC message comprising an indication of the configured CORESET.

Aspect 34: An apparatus for wireless communications, comprising: a processor of a UE; a transceiver coupled with the processor; and memory coupled with the processor, the memory and the processor configured to cause the apparatus to perform a method of any of aspects 1 through 17.

Aspect 35: An apparatus for wireless communications at a UE, comprising at least one means for performing a method of any of aspects 1 through 17.

Aspect 36: A non-transitory computer-readable medium storing code for wireless communications at a UE, the code comprising instructions executable by a processor to perform a method of any of aspects 1 through 17.

Aspect 37: An apparatus for wireless communications, comprising: a processor of a base station; a transceiver coupled with the processor; and memory coupled with the processor, the memory and the processor configured to cause the apparatus to perform a method of any of aspects 18 through 26.

Aspect 38: An apparatus for wireless communications at a base station, comprising at least one means for performing a method of any of aspects 18 through 26.

Aspect 39: A non-transitory computer-readable medium storing code for wireless communications at a base station, the code comprising instructions executable by a processor to perform a method of any of aspects 18 through 26.

Aspect 40: An apparatus for wireless communications, comprising: a processor of a UE; a transceiver coupled with the processor; and memory coupled with the processor, the memory and the processor configured to perform a method of any of aspects 27 through 30.

Aspect 41: An apparatus for wireless communications at a UE, comprising at least one means for performing a method of any of aspects 27 through 30.

Aspect 42: A non-transitory computer-readable medium storing code for wireless communications at a UE, the code comprising instructions executable by a processor to perform a method of any of aspects 27 through 30.

Aspect 43: An apparatus for wireless communications, comprising: a processor of a base station; a transceiver coupled with the processor; and memory coupled with the processor, the memory and the processor configured to perform a method of any of aspects 31 through 33.

Aspect 44: An apparatus for wireless communications at a base station, comprising at least one means for performing a method of any of aspects 31 through 33.

Aspect 45: A non-transitory computer-readable medium storing code for wireless communications at a base station, the code comprising instructions executable by a processor to perform a method of any of aspects 31 through 33.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving an indication of a control resource set configured with a first set of resource element group bundles associated with a first transmission configuration indicator state and a second set of resource element group bundles associated with a second transmission configuration indicator state;
    refraining from interleaving the first set of resource element group bundles associated with the first transmission configuration indicator state based at least in part on applying an identity function to the first set of resource element group bundles;
    refraining from interleaving the second set of resource element group bundles associated with the second transmission configuration indicator state based at least in part on applying the identity function to the second set of resource element group bundles;
    mapping each control channel element of the control resource set to one or more first resource element group bundles of the first set of resource element group bundles, one or more second resource element group bundles of the second set of resource element group bundles, or both based at least in part on the refraining from interleaving the first set of resource element group bundles and the refraining from interleaving the second set of resource element group bundles;
    determining a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and
    monitoring for a downlink control information message in the physical downlink control channel candidate associated with the control resource set based at least in part on the set of control channel elements.

2. The method of claim 1, further comprising:
    generating a first set of indices for the first set of resource element group bundles associated with the first transmission configuration indicator state; and
    separately generating a second set of indices for the second set of resource element group bundles associated with the second transmission configuration indicator state.

3. The method of claim 1, wherein the mapping comprises:
    mapping a first control channel element of the control resource set to the one or more first resource element group bundles of the first set of resource element group bundles based at least in part on a first index of the first control channel element; and
    mapping a second control channel element of the control resource set to the one or more second resource element group bundles of the second set of resource element group bundles based at least in part on a second index of the second control channel element, wherein the set of control channel elements for the physical downlink control channel candidate comprises at least the first control channel element and the second control channel element.

4. The method of claim 3, wherein:
    the first control channel element is mapped to the one or more first resource element group bundles of the first set of resource element group bundles based at least in part on the first index being even; and
    the second control channel element is mapped to the one or more second resource element group bundles of the second set of resource element group bundles based at least in part on the second index being odd.

5. The method of claim 1, wherein the mapping comprises:
    mapping a first control channel element of the control resource set to the one or more first resource element group bundles of the first set of resource element group bundles and the one or more second resource element group bundles of the second set of resource element group bundles, wherein the set of control channel elements for the physical downlink control channel candidate comprises at least the first control channel element.

6. The method of claim 5, wherein the mapping the first control channel element comprises:
alternating mapping the first control channel element to a respective resource element group bundle of the first set of resource element group bundles and to a respective resource element group bundle of the second set of resource element group bundles.

7. The method of claim 1, further comprising:
receiving a radio resource control message indicating a control channel element mapping rule, wherein the mapping is based at least in part on the control channel element mapping rule.

8. The method of claim 1, further comprising:
storing, in memory, a control channel element mapping rule, wherein the mapping is based at least in part on the control channel element mapping rule.

9. The method of claim 1, further comprising:
receiving a radio resource control message configuring the first set of resource element group bundles with the first transmission configuration indicator state and the second set of resource element group bundles with the second transmission configuration indicator state.

10. The method of claim 1, further comprising:
storing, in memory, a transmission configuration indicator state mapping rule configuring the first set of resource element group bundles with the first transmission configuration indicator state and the second set of resource element group bundles with the second transmission configuration indicator state.

11. The method of claim 1, further comprising:
receiving, based at least in part on the monitoring, the downlink control information message in the physical downlink control channel candidate according to the first transmission configuration indicator state and the second transmission configuration indicator state based at least in part on the set of control channel elements for the physical downlink control channel candidate comprising at least the first resource element group bundle associated with the first transmission configuration indicator state and at least the second resource element group bundle associated with the second transmission configuration indicator state.

12. The method of claim 1, wherein:
the physical downlink control channel candidate corresponds to an aggregation level; and
the set of control channel elements for the physical downlink control channel candidate comprises a quantity of control channel elements equal to the aggregation level.

13. The method of claim 1, wherein each resource element group bundle of the first set of resource element group bundles and the second set of resource element group bundles comprises a quantity of resource element groups based at least in part on a resource element group bundle size.

14. The method of claim 13, further comprising:
receiving a radio resource control message indicating the resource element group bundle size, wherein the resource element group bundle size is based at least in part on a quantity of symbols of the control resource set.

15. The method of claim 13, wherein the quantity of resource element groups in each resource element group bundle comprises one resource element group, two resource element groups, three resource element groups, or six resource element groups.

16. A method for wireless communications at a user equipment (UE), comprising:
receiving an indication of a control resource set configured with a first set of resource element group bundles associated with a first transmission configuration indicator state and a second set of resource element group bundles associated with a second transmission configuration indicator state;
interleaving the first set of resource element group bundles associated with the first transmission configuration indicator state according to an interleaver function;
separately interleaving the second set of resource element group bundles associated with the second transmission configuration indicator state according to the interleaver function;
mapping each control channel element of the control resource set to one or more first resource element group bundles of the first set of resource element group bundles, one or more second resource element group bundles of the second set of resource element group bundles, or both based at least in part on the interleaved first set of resource element group bundles and the separately interleaved second set of resource element group bundles;
determining a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and
monitoring for a downlink control information message in the physical downlink control channel candidate associated with the control resource set based at least in part on the set of control channel elements.

17. A method for wireless communications at a network device, comprising:
configuring a control resource set with a first set of resource element group bundles associated with a first transmission configuration indicator state and a second set of resource element group bundles associated with a second transmission configuration indicator state;
refraining from interleaving the first set of resource element group bundles associated with the first transmission configuration indicator state based at least in part on applying an identity function to the first set of resource element group bundles;
refraining from interleaving the second set of resource element group bundles associated with the second transmission configuration indicator state based at least in part on applying the identity function to the second set of resource element group bundles;
mapping each control channel element of the control resource set to one or more first resource element group bundles of the first set of resource element group bundles, one or more second resource element group bundles of the second set of resource element group bundles, or both based at least in part on the refraining from interleaving the first set of resource element group bundles and the refraining from interleaving the second set of resource element group bundles;

determining a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and transmitting a downlink control information message in the physical downlink control channel candidate associated with the control resource set based at least in part on the set of control channel elements.

18. The method of claim 17, further comprising:
generating a first set of indices for the first set of resource element group bundles associated with the first transmission configuration indicator state; and
separately generating a second set of indices for the second set of resource element group bundles associated with the second transmission configuration indicator state.

19. The method of claim 17, wherein the mapping comprises:
mapping a first control channel element of the control resource set to the one or more first resource element group bundles of the first set of resource element group bundles based at least in part on a first index of the first control channel element; and
mapping a second control channel element of the control resource set to the one or more second resource element group bundles of the second set of resource element group bundles based at least in part on a second index of the second control channel element, wherein the set of control channel elements for the physical downlink control channel candidate comprises at least the first control channel element and the second control channel element.

20. The method of claim 17, wherein the mapping comprises:
mapping a first control channel element of the control resource set to the one or more first resource element group bundles of the first set of resource element group bundles and the one or more second resource element group bundles of the second set of resource element group bundles, wherein the set of control channel elements for the physical downlink control channel candidate comprises at least the first control channel element.

21. The method of claim 17, further comprising:
transmitting a radio resource control message indicating a control channel element mapping rule, wherein the mapping is based at least in part on the control channel element mapping rule.

22. The method of claim 17, further comprising:
transmitting a radio resource control message configuring the first set of resource element group bundles with the first transmission configuration indicator state and the second set of resource element group bundles with the second transmission configuration indicator state.

23. The method of claim 17, wherein the downlink control information message is transmitted according to the first transmission configuration indicator state and the second transmission configuration indicator state based at least in part on the set of control channel elements for the physical downlink control channel candidate comprising at least the first resource element group bundle associated with the first transmission configuration indicator state and at least the second resource element group bundle associated with the second transmission configuration indicator state.

24. A method for wireless communications at a network device, comprising:
configuring a control resource set with a first set of resource element group bundles associated with a first transmission configuration indicator state and a second set of resource element group bundles associated with a second transmission configuration indicator state;
interleaving the first set of resource element group bundles associated with the first transmission configuration indicator state according to an interleaver function;
separately interleaving the second set of resource element group bundles associated with the second transmission configuration indicator state according to the interleaver function;
mapping each control channel element of the control resource set to one or more first resource element group bundles of the first set of resource element group bundles, one or more second resource element group bundles of the second set of resource element group bundles, or both based at least in part on the interleaved first set of resource element group bundles and the separately interleaved second set of resource element group bundles;
determining a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and
transmitting a downlink control information message in the physical downlink control channel candidate associated with the control resource set based at least in part on the set of control channel elements.

25. An apparatus for wireless communications, comprising:
one or more processors of a user equipment (UE);
a transceiver coupled with the one or more processors; and
one or more memories coupled with the one or more processors, the one or more memories and the one or more processors configured to cause the apparatus to:
receive, via the transceiver, an indication of a control resource set configured with a first set of resource element group bundles associated with a first transmission configuration indicator state and a second set of resource element group bundles associated with a second transmission configuration indicator state;
refrain from interleaving the first set of resource element group bundles associated with the first transmission configuration indicator state based at least in part on a first application of an identity function to the first set of resource element group bundles;
refrain from interleaving the second set of resource element group bundles associated with the second transmission configuration indicator state based at least in part on a second application of the identity function to the second set of resource element group bundles;
map each control channel element of the control resource set to one or more first resource element group bundles of the first set of resource element group bundles, one or more second resource element group bundles of the second set of resource element group bundles, or both based at least in part on the refraining from interleaving the first set of resource element group bundles and the refraining from interleaving the second set of resource element group bundles;
determine a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and
monitor, via the transceiver, for a downlink control information message in the physical downlink control channel candidate associated with the control resource set based at least in part on the set of control channel elements.

26. An apparatus for wireless communications, comprising:
one or more processors of a user equipment (UE);
a transceiver coupled with the one or more processors; and
one or more memories coupled with the one or more processors, the one or more memories and the one or more processors configured to cause the apparatus to:
receive, via the transceiver, an indication of a control resource set configured with a first set of resource element group bundles associated with a first transmission configuration indicator state and a second set of resource element group bundles associated with a second transmission configuration indicator state;
interleave the first set of resource element group bundles associated with the first transmission configuration indicator state according to an interleaver function;
separately interleave the second set of resource element group bundles associated with the second transmission configuration indicator state according to the interleaver function
map each control channel element of the control resource set to one or more first resource element group bundles of the first set of resource element group bundles, one or more second resource element group bundles of the second set of resource element group bundles, or both based at least in part on the interleaved first set of resource element group bundles and the separately interleaved second set of resource element group bundles
determine a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and
monitor, via the transceiver, for a downlink control information message in the physical downlink control channel candidate associated with the control resource set based at least in part on the set of control channel elements.

27. An apparatus for wireless communications, comprising:
one or more processors of a network device; and
one or more memories coupled with the one or more processors, the one or more memories and the one or more processors configured to cause the apparatus to:
configure a control resource set with a first set of resource element group bundles associated with a first transmission configuration indicator state and a second set of resource element group bundles associated with a second transmission configuration indicator state;
refrain from interleaving the first set of resource element group bundles associated with the first transmission configuration indicator state based at least in part on a first application of an identity function to the first set of resource element group bundles;
refrain from interleaving the second set of resource element group bundles associated with the second transmission configuration indicator state based at least in part on a second application of the identity function to the second set of resource element group bundles;
map each control channel element of the control resource set to one or more first resource element group bundles of the first set of resource element group bundles, one or more second resource element group bundles of the second set of resource element group bundles, or both based at least in part on the refraining from interleaving the first set of resource element group bundles and the refraining from interleaving the second set of resource element group bundles;
determine a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and
transmit, via the transceiver, a downlink control information message in the physical downlink control channel candidate associated with the control resource set based at least in part on the set of control channel elements.

28. An apparatus for wireless communications, comprising:
one or more processors of a network device; and
one or more memories coupled with the one or more processors, the one or more memories and the one or more processors configured to cause the apparatus to:

configure a control resource set with a first set of resource element group bundles associated with a first transmission configuration indicator state and a second set of resource element group bundles associated with a second transmission configuration indicator state;

interleave the first set of resource element group bundles associated with the first transmission configuration indicator state according to an interleaver function;

separately interleave the second set of resource element group bundles associated with the second transmission configuration indicator state according to the interleaver function map each control channel element of the control resource set to one or more first resource element group bundles of the first set of resource element group bundles, one or more second resource element group bundles of the second set of resource element group bundles, or both based at least in part on the interleaved first set of resource element group bundles and the separately interleaved second set of resource element group bundles;

determine a set of control channel elements for a physical downlink control channel candidate associated with the control resource set based at least in part on the mapping, the set of control channel elements comprising at least a first resource element group bundle of the first set of resource element group bundles associated with the first transmission configuration indicator state and at least a second resource element group bundle of the second set of resource element group bundles associated with the second transmission configuration indicator state; and transmit, via the transceiver, a downlink control information message in the physical downlink control channel candidate associated with the control resource set based at least in part on the set of control channel elements.

* * * * *